(12) United States Patent
Go et al.

(10) Patent No.: US 12,177,864 B2
(45) Date of Patent: Dec. 24, 2024

(54) METHOD AND APPARATUS FOR TRANSMITTING AND RECEIVING PHYSICAL UPLINK SHARED CHANNEL IN WIRELESS COMMUNICATION SYSTEM

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 17/629,746

(22) PCT Filed: Jul. 27, 2020

(86) PCT No.: PCT/KR2020/009876
§ 371 (c)(1),
(2) Date: Jan. 24, 2022

(87) PCT Pub. No.: WO2021/020847
PCT Pub. Date: Feb. 4, 2021

(65) Prior Publication Data
US 2022/0272674 A1 Aug. 25, 2022

(30) Foreign Application Priority Data
Jul. 26, 2019 (KR) .......................... 10-2019-0091327

(51) Int. Cl.
*H04W 72/23* (2023.01)

(52) U.S. Cl.
CPC .................................. *H04W 72/23* (2023.01)

(58) Field of Classification Search
CPC ....................................................... H04W 72/23
See application file for complete search history.

(56) References Cited

U.S. PATENT DOCUMENTS

2022/0217654 A1* 7/2022 Kang ..................... H04W 52/14
2022/0239440 A1* 7/2022 Go ......................... H04L 5/0091

FOREIGN PATENT DOCUMENTS

KR      1020180018504        2/2018

OTHER PUBLICATIONS

NPL1 (3GPP TSG RAN WG1 Meeting #97, Reno USA May 13-17, 2019, R1-1906276, Discussion on UL multi-panel transmission; reference is already in the file; hereinafter NPL1) (Year: 2019).*

(Continued)

*Primary Examiner* — Michael A Keller
(74) *Attorney, Agent, or Firm* — LEE, HONG, DEGERMAN, KANG & WAIMEY

(57) ABSTRACT

A method of transmitting, by a user equipment (UE), a physical uplink shared channel (PUSCH) in a wireless communication system is disclosed. The method comprises receiving configuration information related to the PUSCH, receiving downlink control information (DCI) scheduling the PUSCH, and transmitting the PUSCH based on the DCI. The DCI includes a specific field. Based on that the specific field represents at least one SRS resource related to a simultaneous transmission across multi-panel (ST×MP), the PUSCH is transmitted based on a plurality of panels.

12 Claims, 13 Drawing Sheets

(56) References Cited

OTHER PUBLICATIONS

NPL2 (ZTE, Discussion on UL power control for multi-panel operation, R1-1906250, 3GPP TSG RAN WG1 Meeting #97, Reno USA May 4, 2019; reference is already in file; hereinafter NPL2) (Year: 2019).*
NPL3 (Nokia, Enhancement on Multi-beam Operation, R1-1907317, 3GPP TSG RAN WG1 Meeting # 97, Reno USA May 3, 2019; reference is already in file; hereinafter NPL3) (Year: 2019).*
PCT International Application No. PCT/KR2020/009876, International Search Report dated Oct. 26, 2020, 5 pages.
Lenovo et al., "Discussion on UL multi-panel transmission," 3GPP TSG RAN WG1 Meeting #97, R1-1906276, May 2019, 8 pages.
ZTE, "Discussion on UL power control for multi-panel operation," 3GPP TSG RAN WG1 Meeting #97, R1-1906250, May 2019, 3 pages.
Nokia et al., "Enhancements on Multi-beam Operation," 3GPP TSG RAN WG1 #97 Meeting, R1-1907317, May 2019, 19 pages.
OPPO, "Discussion on Multi-beam Operation Enhancements," 3GPP TSG RAN WG1 #97, R1-1906288, May 2019, 10 pages.

* cited by examiner

[FIG. 1]
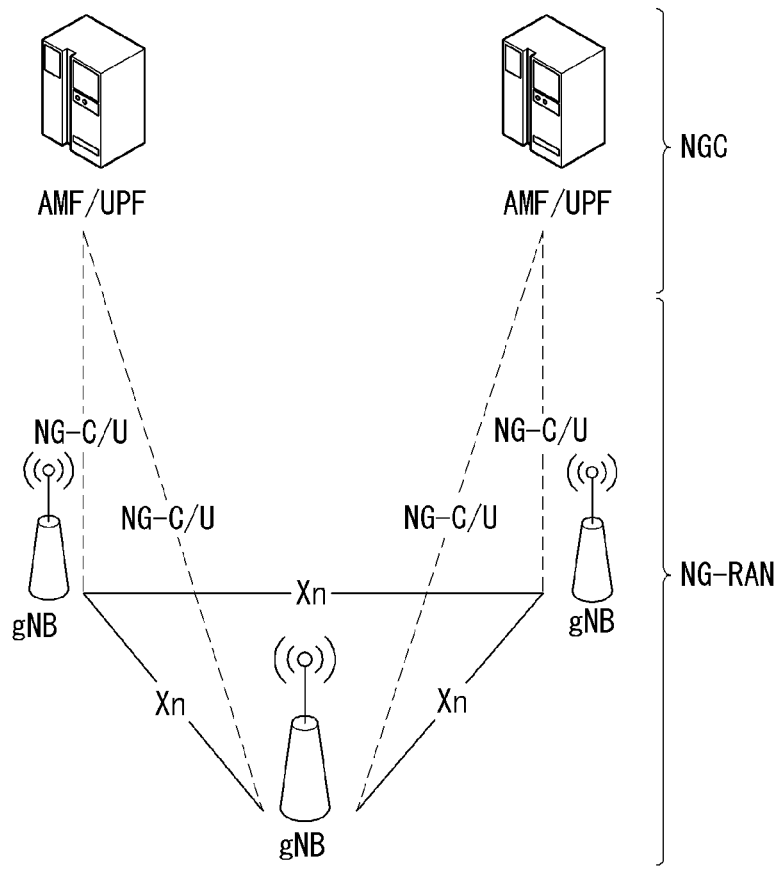
[FIG. 2]
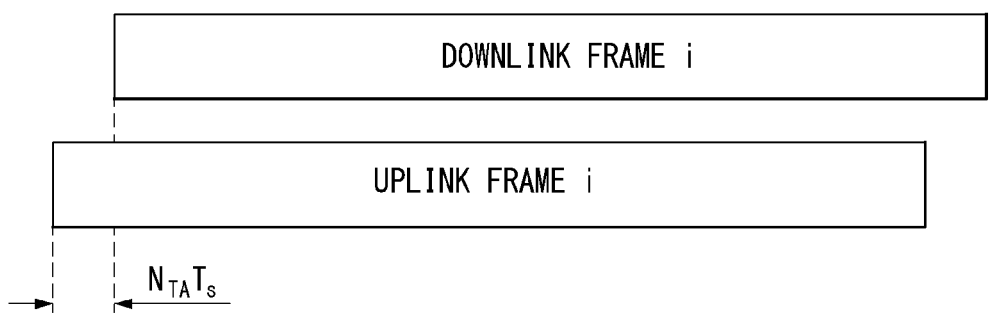

[FIG. 3]
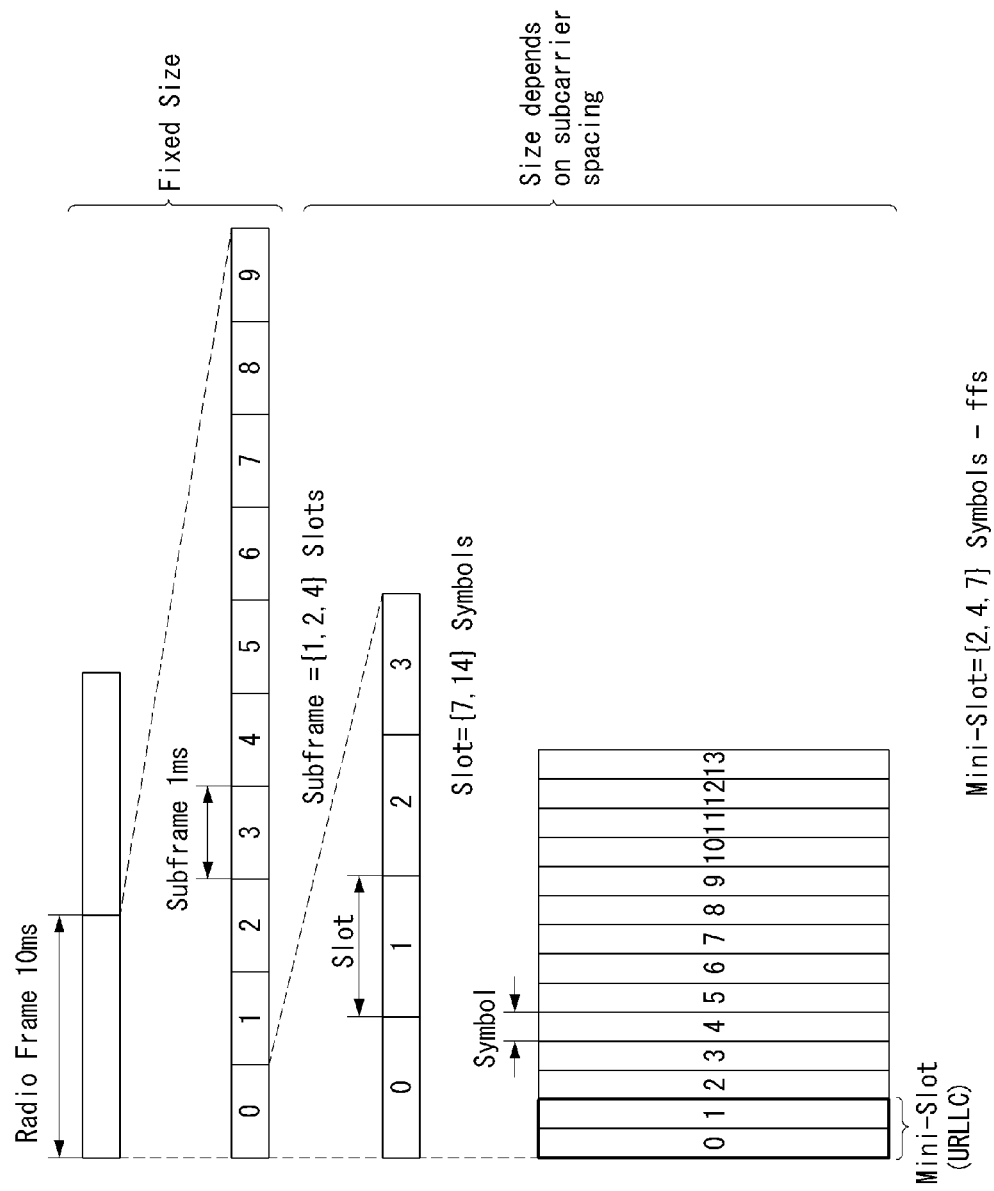

[FIG. 4]
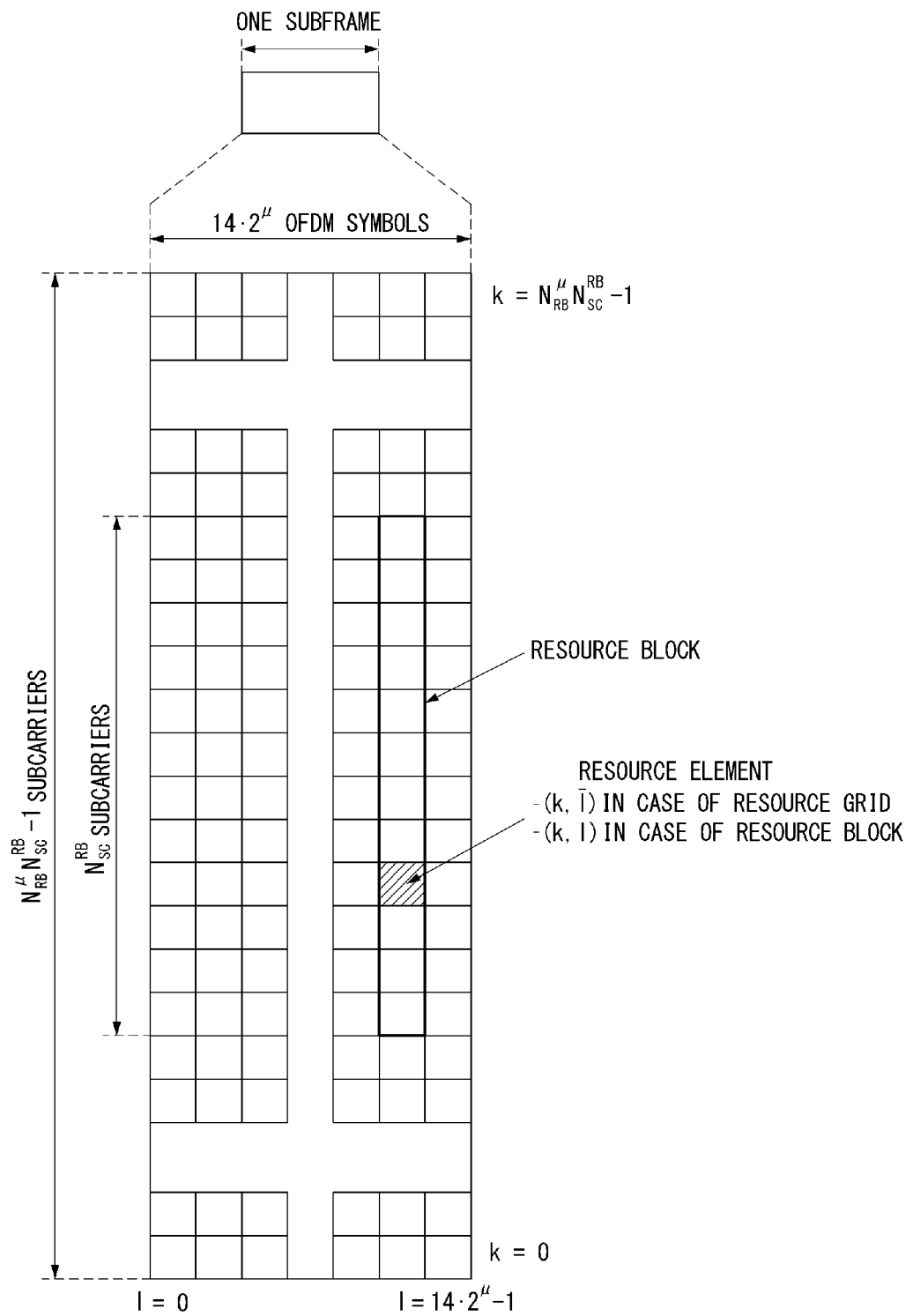

[FIG. 5]
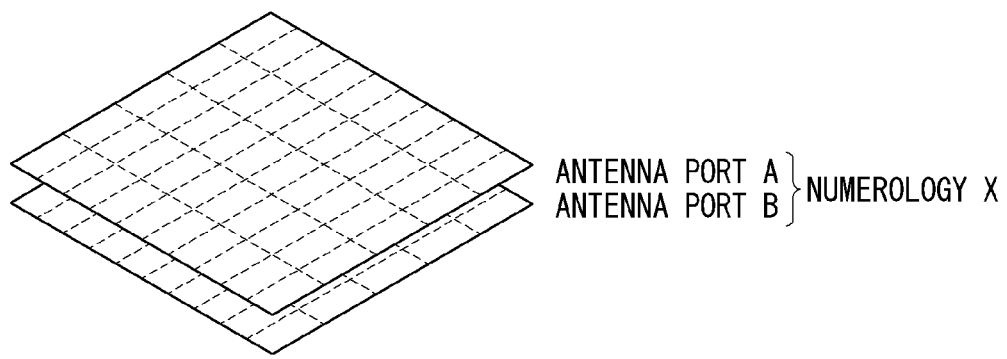
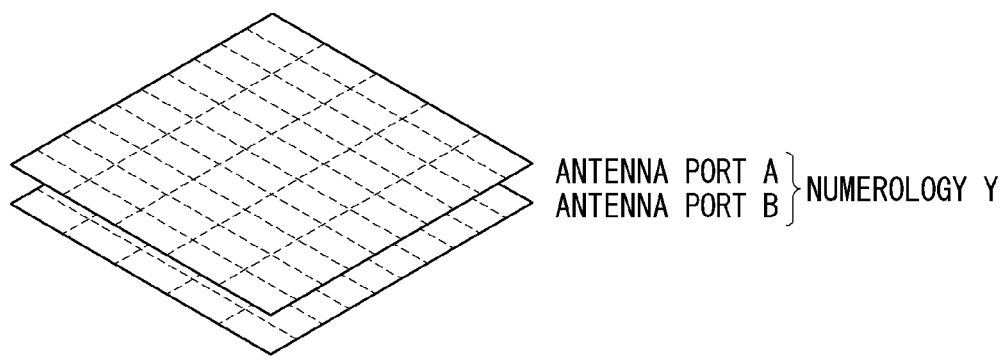

[FIG. 7]
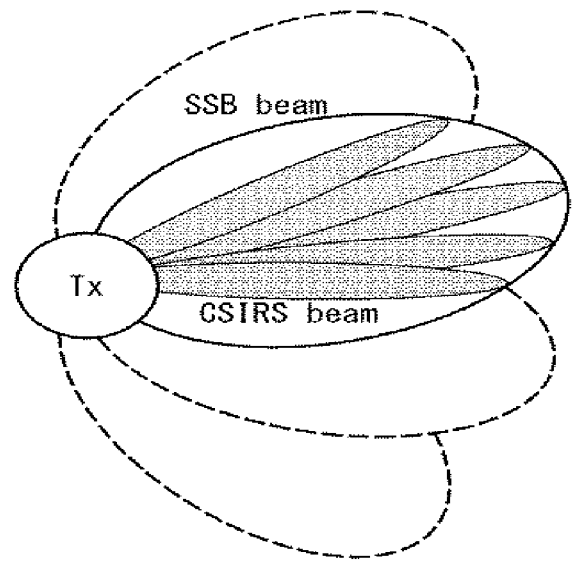
[FIG. 8]
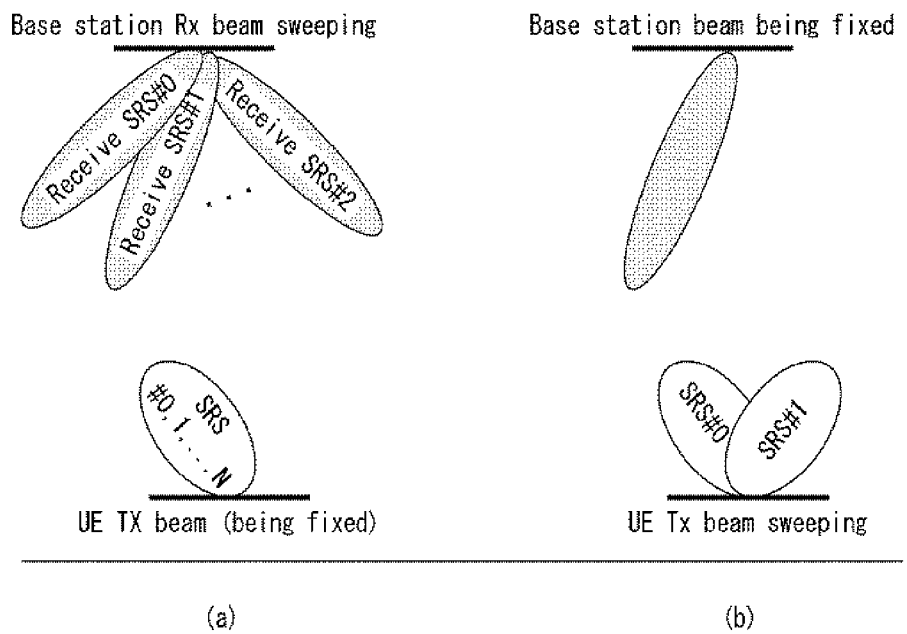
(a)                      (b)

[FIG. 9]
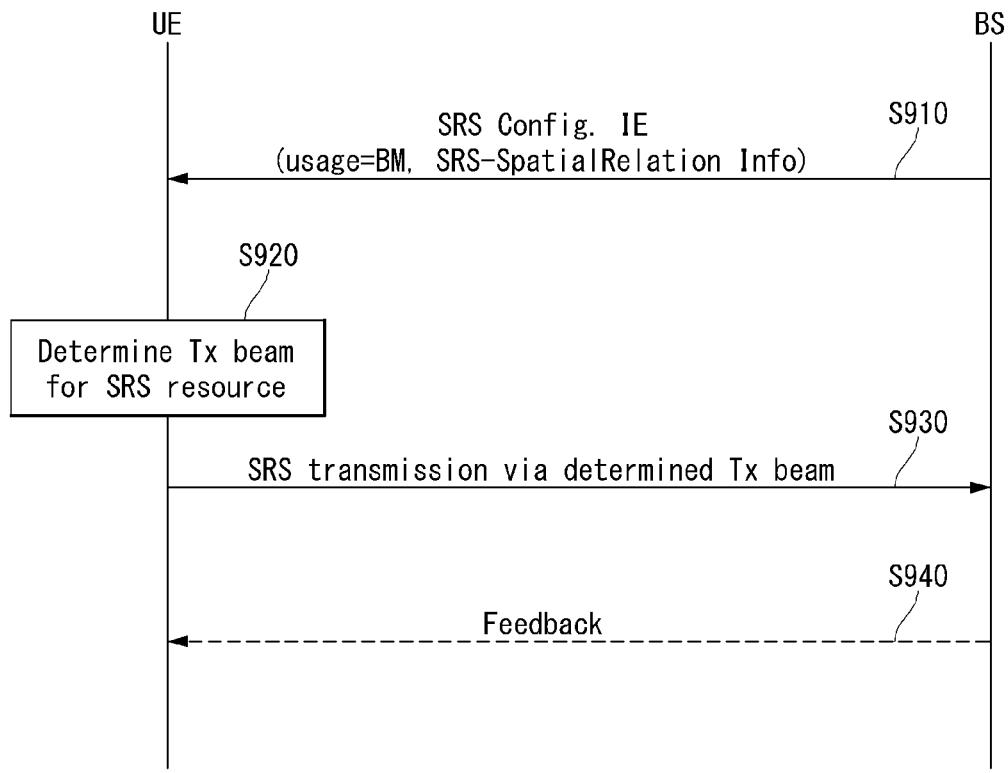
[FIG. 10]
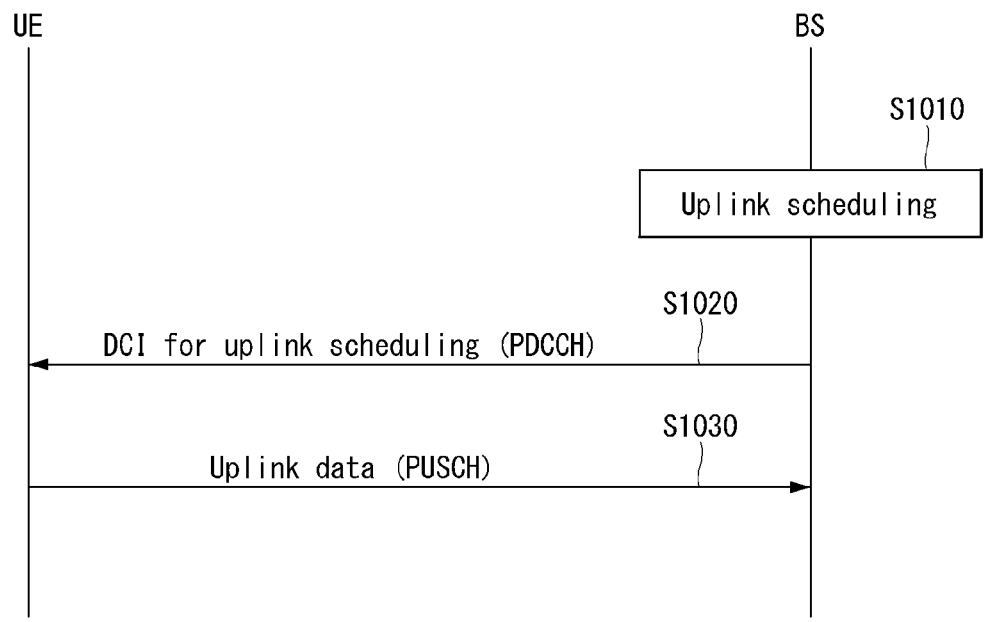

[FIG. 11]
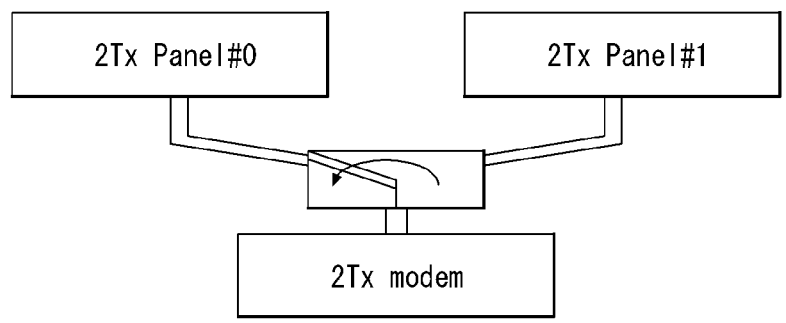
[FIG. 12]
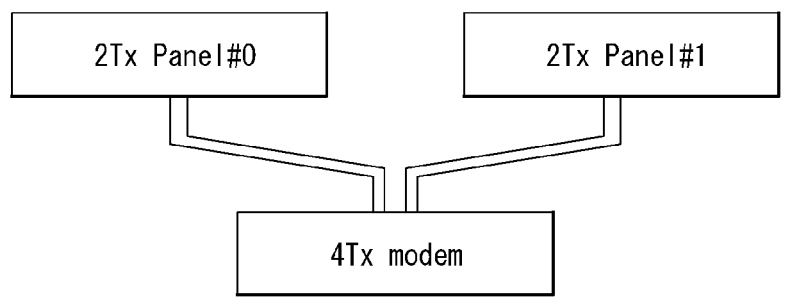

[FIG. 13]
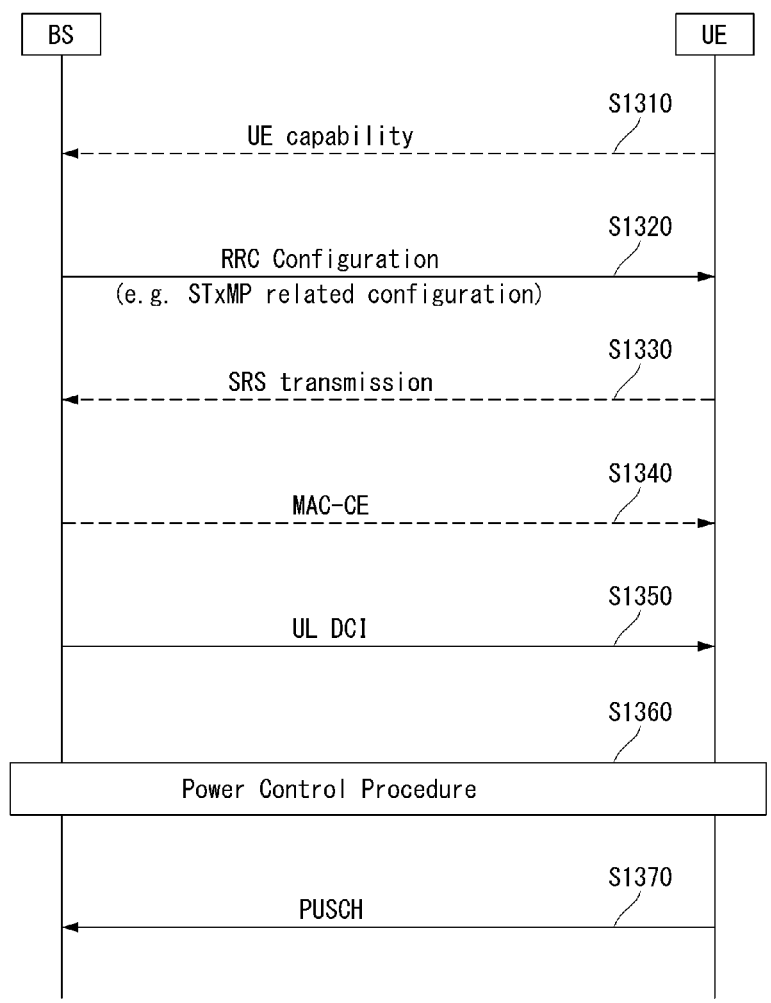

[FIG. 14]
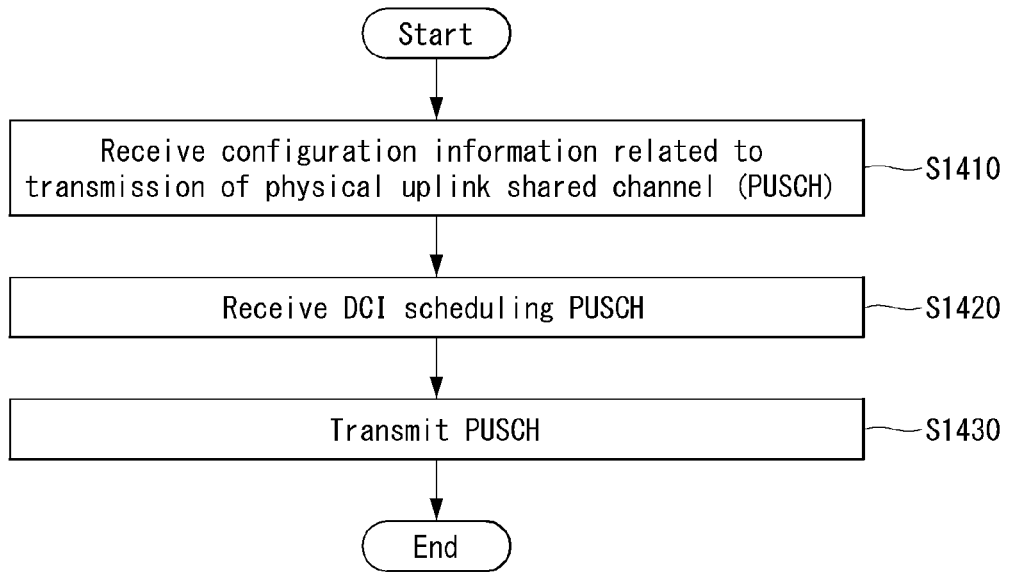
[FIG. 15]
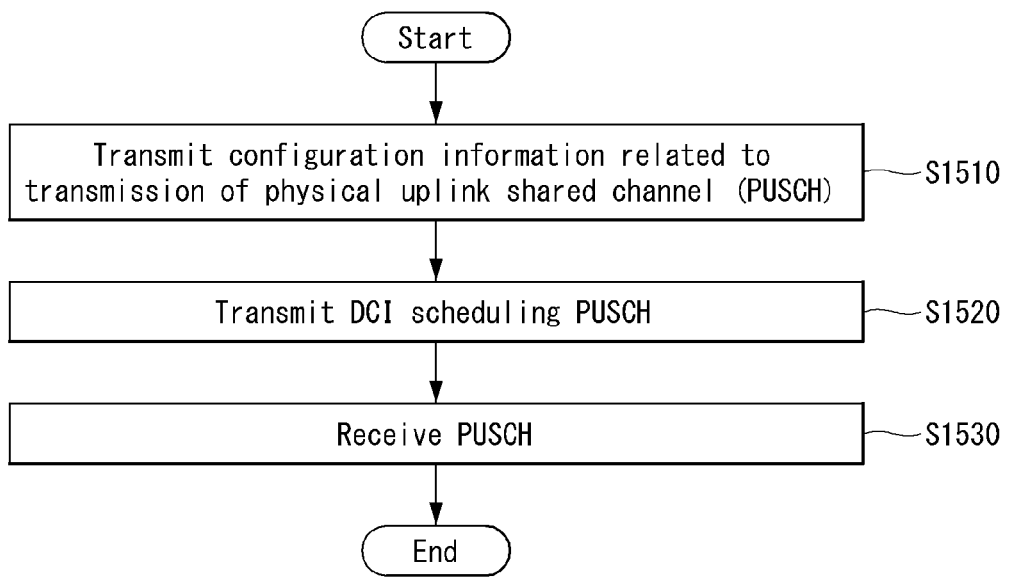

[FIG. 16]
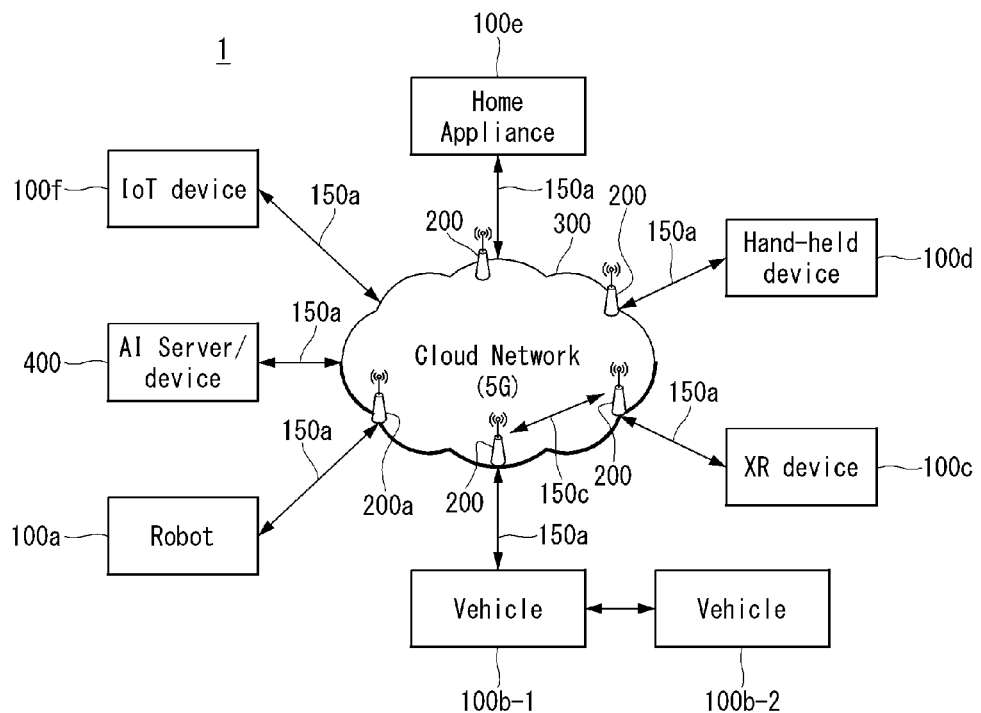
[FIG. 17]
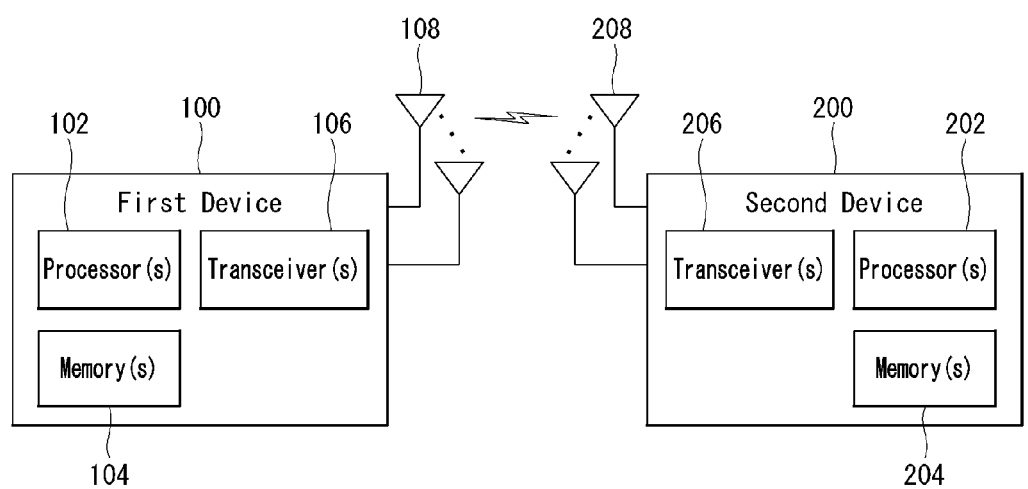

[FIG. 18]
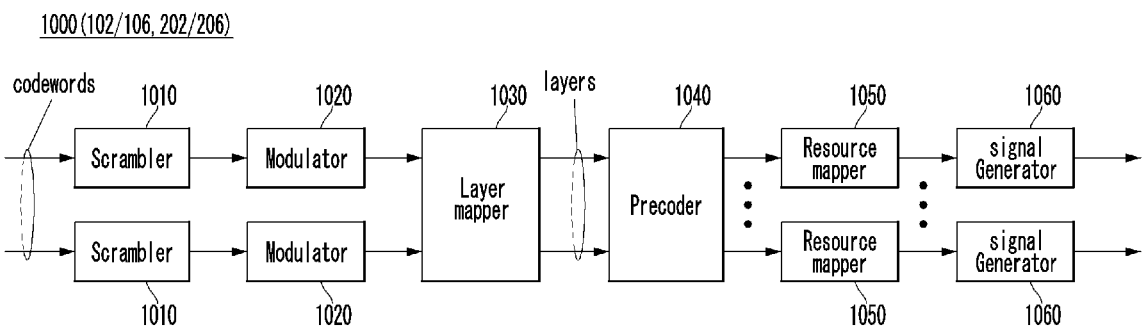
[FIG. 19]
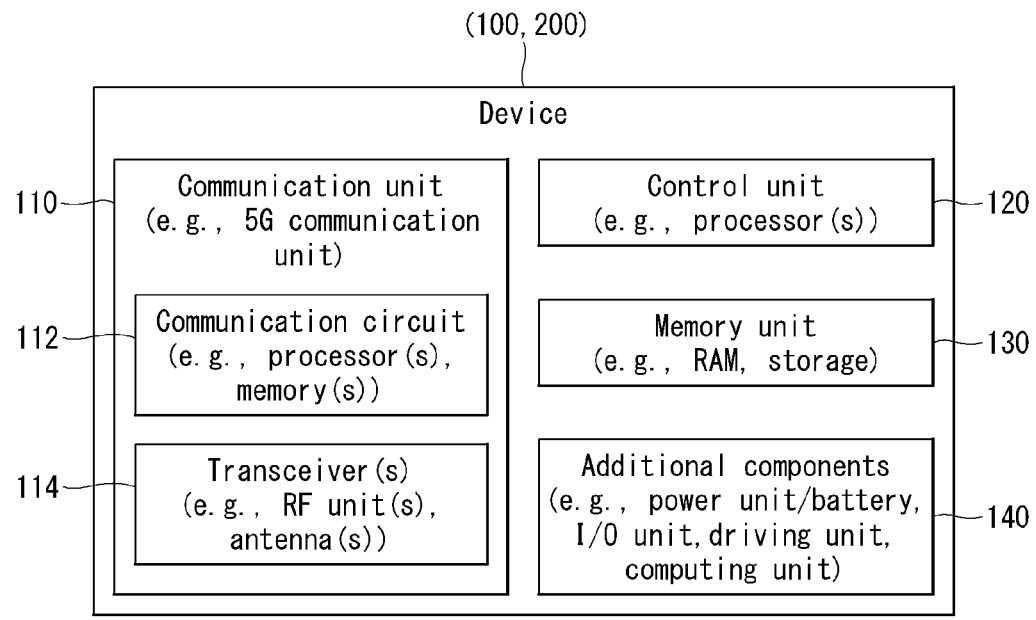

[FIG. 20]
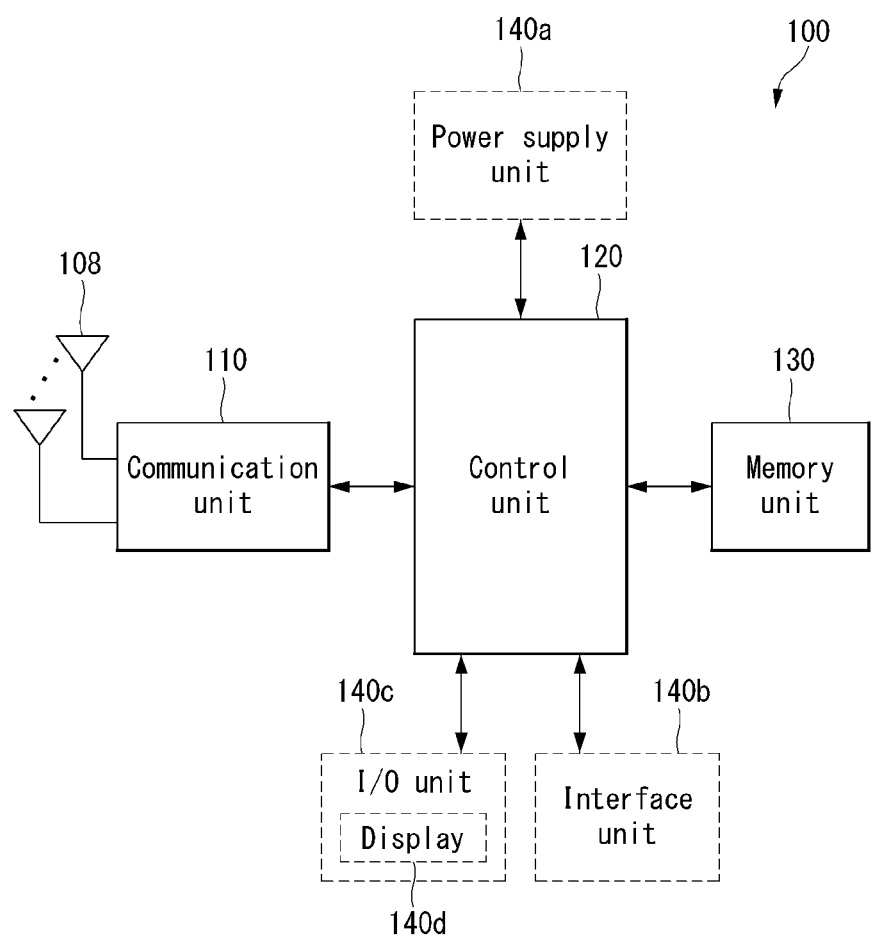

METHOD AND APPARATUS FOR TRANSMITTING AND RECEIVING PHYSICAL UPLINK SHARED CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2020/009876, filed on Jul. 27, 2020, which claims the benefit of earlier filing date and right of priority to Korean Application No. 10-2019-0091327, filed on Jul. 26, 2019, the contents of which are all incorporated by reference herein in their entirety.

TECHNICAL FIELD

The present disclosure relates to a method of transmitting and receiving a physical uplink shared channel in a wireless communication system and a device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method of transmitting a physical uplink shared channel.

More specifically, the present disclosure provides a method of transmitting a physical uplink shared channel of a UE supporting a simultaneous transmission across multi-panel (STxMP).

The technical objects of the present disclosure are not limited to the aforementioned technical objects, and other technical objects, which are not mentioned above, will be apparently appreciated by a person having ordinary skill in the art from the following description.

Technical Solution

In one aspect of the present disclosure, there is provided a method of transmitting, by a user equipment (UE), a physical uplink shared channel (PUSCH) in a wireless communication system, the method comprising receiving configuration information related to the PUSCH, receiving downlink control information (DCI) scheduling the PUSCH, and transmitting the PUSCH based on the DCI.

The DCI includes a specific field. Based on that the specific field represents at least one SRS resource related to a simultaneous transmission across multi-panel (STxMP), the PUSCH is transmitted based on a plurality of panels.

The specific field may be based on an SRI field.

The SRI field may represent at least one specific SRS resource, and the specific SRS resource may be based on i) a first parameter related to the plurality of panels, and ii) a second parameter related to one panel of the plurality of panels.

Based on that the SRI field represents a plurality of specific SRS resources, a usage of the specific SRS resources may be related to the STxMP.

Based on that the SRI field represents a plurality of specific SRS resources, the specific SRS resources may be based on at least one SRS resource belonging to an SRS resource group related to the STxMP.

Based on that the SRI field represents one specific SRS resource, the specific SRS resource may be configured with at least one parameter having a plurality of values. The second parameter may be a parameter having the plurality of values, and the first parameter may be a parameter having one value.

A transmission power of the PUSCH related to at least one of the plurality of panels may be determined based on the specific field.

The method may further comprise receiving configuration information for a sounding reference signal (SRS) related to the STxMP, and transmitting the SRS based on the configuration information for the SRS. The specific field may be determined based on the SRS.

Based on that the PUSCH is a codebook based PUSCH, a number of bits of at least one field included in the DCI may be determined based on a number of the plurality of panels.

The at least one field may include at least one of a TPMI field or an MCS field.

Based on that the TPMI field represents a preconfigured state, a panel related to the preconfigured state among the plurality of panels may be off.

The configuration information may include information for a mapping between a codepoint of the specific field and the at least one SRS resource related to the STxMP.

In another aspect of the present disclosure, there is provided a user equipment (UE) transmitting a physical uplink shared channel (PUSCH) in a wireless communication system, the UE comprising one or more transceivers, one or more processors configured to control the one or more transceivers, and one or more memories operatively connected to the one or more processors and configured to store instructions performing operations when a transmission of the PUSCH is executed by the one or more processors.

The operations comprise receiving configuration information related to the PUSCH, receiving downlink control information (DCI) scheduling the PUSCH, and transmitting the PUSCH based on the DCI.

The DCI includes a specific field. Based on that the specific field represents at least one SRS resource related to a simultaneous transmission across multi-panel (STxMP), the PUSCH is transmitted based on a plurality of panels.

In another aspect of the present disclosure, there is provided a device comprising one or more memories, and one or more processors operatively connected to the one or more memories.

The one or more processors are configured to allow the device to receive configuration information related to a physical uplink shared channel (PUSCH), receive downlink control information (DCI) scheduling the PUSCH, and transmit the PUSCH based on the DCI.

The DCI includes a specific field. Based on that the specific field represents at least one SRS resource related to a simultaneous transmission across multi-panel (STxMP), the PUSCH is transmitted based on a plurality of panels.

In another aspect of the present disclosure, there is provided one or more non-transitory computer readable mediums (CRMs) storing one or more instructions.

The one or more instructions executable by one or more processors allow a user equipment (UE) to receive configuration information related to a physical uplink shared channel (PUSCH), receive downlink control information (DCI) scheduling the PUSCH, and transmit the PUSCH based on the DC.

The DCI includes a specific field. Based on that the specific field represents at least one SRS resource related to a simultaneous transmission across multi-panel (STxMP), the PUSCH is transmitted based on a plurality of panels.

In another aspect of the present disclosure, there is provided a method of receiving, by a base station, a physical uplink shared channel (PUSCH) in a wireless communication system, the method comprising transmitting configuration information related to the PUSCH, transmitting downlink control information (DCI) scheduling the PUSCH, and receiving the PUSCH based on the DCI.

The DCI includes a specific field. Based on that the specific field represents at least one SRS resource related to a simultaneous transmission across multi-panel (STxMP), the PUSCH is transmitted based on a plurality of panels.

In another aspect of the present disclosure, there is provided a base station receiving a physical uplink shared channel (PUSCH) in a wireless communication system, the base station comprising one or more transceivers, one or more processors configured to control the one or more transceivers, and one or more memories operatively connected to the one or more processors and configured to store instructions performing operations when a reception of the PUSCH is executed by the one or more processors.

The operations comprise transmitting configuration information related to the PUSCH, transmitting downlink control information (DCI) scheduling the PUSCH, and receiving the PUSCH based on the DCI.

The DCI includes a specific field. Based on that the specific field represents at least one SRS resource related to a simultaneous transmission across multi-panel (STxMP), the PUSCH is transmitted based on a plurality of panels.

Advantageous Effects

According to an embodiment of the present disclosure, based on that a specific field of downlink control information (DCI) scheduling a PUSCH represents at least one SRS resource related to a simultaneous transmission across multi-panel (STxMP), the PUSCH is transmitted based on a plurality of panels. Information (e.g., beam, precoder, panel ID, etc.) for each of the plurality of panels can be simultaneously indicated by the specific field, and thus a signaling overhead for scheduling of STxMP PUSCH transmission can be reduced.

According to an embodiment of the present disclosure, the specific field can be based on an SRI field, and the SRI field can represent at least one specific SRS resource. The specific SRS resource can be based on i) a first parameter related to the plurality of panels, and ii) a second parameter related to one panel of the plurality of panels. Thus, at least one specific SRS resource is indicated based on the first parameter that is common to the plurality of panels through the SRI field and the second parameter configured for each panel, and thus transmission of STxMP PUSCH can be scheduled based on interference measurement information between the panels and UL channel information.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart showing an example of an uplink transmission/reception operation to which a method proposed in the present disclosure may be applied.

FIG. 11 and FIG. 12 illustrate an example of multi-panel based on an RF switch applied to the disclosure.

FIG. 13 illustrates an example of signaling between a UE and a base station to which methods described in the present disclosure are applicable.

FIG. 14 is a flow chart illustrating a method of transmitting, by a UE, a physical uplink shared channel in a wireless communication system according to an embodiment of the present disclosure.

FIG. 15 is a flow chart illustrating a method of receiving, by a base station, a physical uplink shared channel in a wireless communication system according to another embodiment of the present disclosure.

FIG. 16 illustrates a communication system 1 applied to the present disclosure.

FIG. 17 illustrates wireless devices applicable to the present disclosure.

FIG. 18 illustrates a signal process circuit for a transmission signal.

FIG. 19 illustrates another example of a wireless device applied to the present disclosure.

FIG. 20 illustrates a hand-held device applied to the present disclosure.

MODE FOR INVENTION

Figure 6:
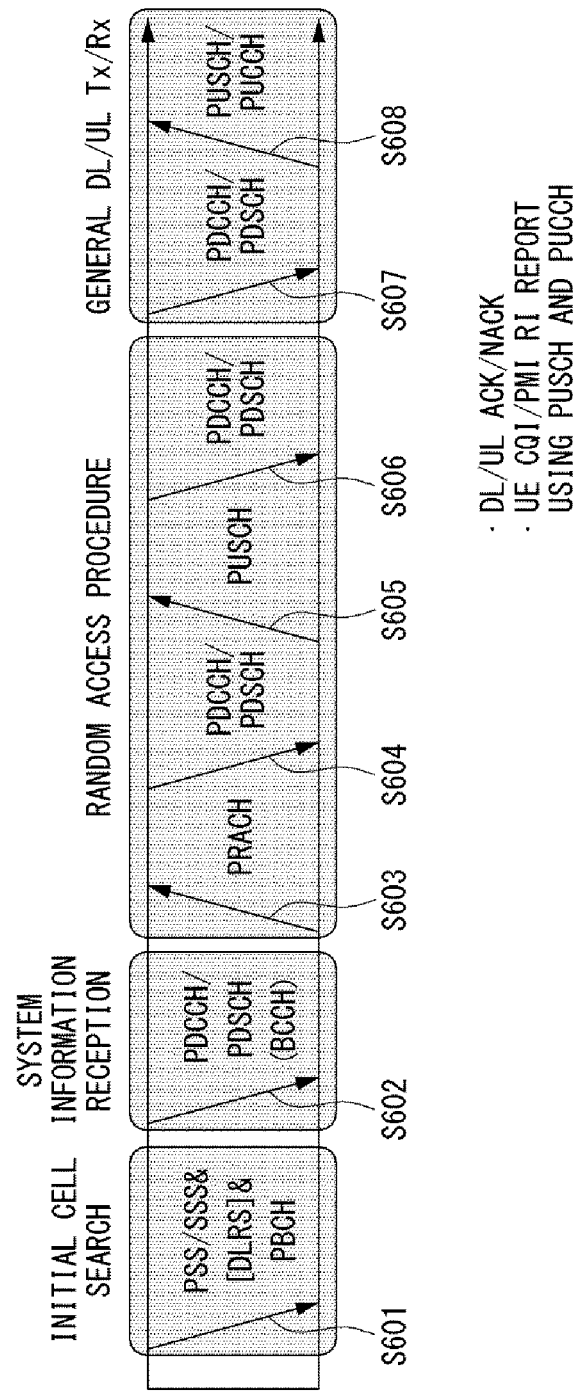
FIG. 6 illustrates physical channels and general signal transmission used in a 3GPP system.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s = 10$ ms. Here, the radio frame is constituted of 10 subframes each of which has a period of $T_{sf}=N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^{\mu} \in \{0, \ldots, N_{subframe}^{slots,\mu}-1\}$ in the subframe and in ascending order of $n_{s,f}^{\mu} \in \{0, \ldots, N_{frame}^{slots,\mu}-1\}$ in the radio frame. One slot includes consecutive OFDM symbols of $N_{symb}^{\mu}$, and $N_{symb}^{\mu}$ is determined according to the used numerology and slot configuration. In the subframe, the start of slot $n_s^{\mu}$ is temporally aligned with the start of $n_s^{\mu} N_{symb}^{\mu}$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $\alpha_{k,\bar{l}}^{(p,\mu)}$. When there is no risk for confusion or when a specific antenna port or numerology is not specified, the indexes p and μ may be dropped, and as a result, the complex value may be $\alpha_{k,\bar{l}}^{(p)}$ or $\alpha_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State : :=              SEQUENCE {
   tci-StateId                 TCI-StateId,
   qcl-Type1                   QCL-Info,
   qcl-Type2                   QCL-Info
   ...
}
QCL-Info : :=               SEQUENCE {
   cell                        ServCellIndex
   bwp-Id                      BWP-Id
   referenceSignal             CHOICE {
      csi-rs                      NZP-CSI-RS-ResourceId,
      ssb                         SSB-Index
   },
   qcl-Type                    ENUMERATED {typeA, typeB, typeC, typeD},
   ...
}
```

TABLE 5-continued

```
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config : :=                              SEQUENCE {
    srs-ResourceSetToReleaseList                 SEQUENCE (SIZE(1 . . . maxNrofSRS-
ResourceSets) ) OF SRSRRsourceSetId              OPTIONAL, -- Need N
    srs-ResourceSetToAddModList                  SEQUENCE (SIZE(1 . . . maxNrofSRS-
ResourceSets) ) OF SRS-ResoureeSet               OPTIONAL, -- Need N
    srs-ResourceToReleaseList                    SEQUENCE (SIZE(1 . . . maxNrofSRS-
Resources) ) OF SRS-PcsourceId                   OPTIONAL, -- Need N
srs-ResourceToAddModList                         SEQUENCE (SIZE(1 . . . maxNrofSRS-
Resources)) OF SRS-Resource                      OPTIONAL, -- Need N
    tpc-Accumulation                             ENUMERATED {disabled}
    . . .
}
SRS-ResourceSet : :-                         SEQUENCE {
    srs-ResourceSetId                            SRS-ResourceSetID
    srs-ResourceIdList                           SEQUENCE (SIZE(1 . . . maxNrofSRS-
RescourcesPerSet) ) OF SRS-ResourceId            OPTIONAL, -- Cond Setup
    resourceType                                 CHOICE {
        aperiodic                                    SEQUENCE {
            aperiodicSRS-ResourceTrigger                 INTEGER (1 . . . maxNrofSRS-
TriggerStates-1),
            csi-RS                                       NZP-CSI-RS-ResourceId
            slotOffset                                   INTEGER (1 . . . 32)
            . . .
        },
        semi-persistent                              SEQUENCE {
            associatedCSI-RS                             NZP-CSI-RS-ResourceId
            . . .
        },
        perodic                                      SEQUENCE {
            associatedCSI-RS                             NZP-CSI-RS-ResourceId
            . . .
        }
    },
    usage                                        ENUMERATED (beamManagement,
codebook, nonCodebook, antennaSwitching),
    alpha                                        Alpha
    p0                                           INTEGER (-202 . . . 24)
    pathlossReferenceRS                          CHOICE {
        ssb-Index                                    SSB-Index,
        csi-RS-Index                                 NZP-CSI-RS-ResourceId
SRS-SpatialRelationInfo : :-                 SEQUENCE {
    servingCellId                                ServCellIndex
    referenceSignal                              CHOICE {
        ssb-Index                                    SSB-Index,
        csi-RS-Index                                 NZP-CSI-RS-ResourceId,
        srs                                          SEQUENCE {
            resourceId                                   SRS-ResourceId,
            uplinkBWP                                    BWP-id
        }
    }
}
SRS-ResourceId : :=                          INTEGER (0,.maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':
  i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or
  ii) if SRS-SpatialRelationInfo is set to 'CSI-RS,' the UE transmits the SRS resource with the same spatial domain transmission filter used for the reception of the periodic CSI-RS or SP CSI-RS; or
  iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 is a flowchart showing an example of an uplink transmission/reception operation to which a method proposed in the present disclosure may be applied.

Referring to FIG. 10, the eNB schedules uplink transmission such as the frequency/time resource, the transport layer, an uplink precoder, the MCS, etc., (S1010). In particular, the eNB may determine a beam for PUSCH transmission of the UE through the aforementioned operations.

The UE receives DCI for downlink scheduling (i.e., including scheduling information of the PUSCH) on the PDCCH (S1020).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1030).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission.

When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Hereinafter, matters related to the definition of a panel in the present disclosure will be described in detail.

A "panel" referred to in the present disclosure may be based on at least one of the following definitions.

According to an embodiment, the "panel" may be interpreted/applied by being transformed into "one panel or a plurality of panels" or a "panel group". The panel may be related to a specific characteristic (e.g., a timing advance (TA), a power control parameter, etc.). The plurality of panels may be panels having a similarity/common value in terms of the specific characteristic.

According to an embodiment, a "panel" may be interpreted/applied by being transformed into "one antenna port or a plurality of antenna ports", "one uplink resource or a plurality of uplink resources", an "antenna port group" or an "uplink resource group (or set)". The antenna port or the uplink resource may be related to a specific characteristic (e.g., a timing advance (TA), a power control parameter, etc.). The plurality of antenna ports (uplink resources) may be antenna ports (uplink resources) having a similarity/common value in terms of the specific characteristic.

According to an embodiment, a "panel" may be interpreted/applied by being transformed into "one beam or a plurality of beams" or "at least one beam group (or set)". The beam (beam group) may be related to a specific characteristic (e.g., a timing advance (TA), a power control parameter, etc.). The plurality of beams (beam groups) may be beams (beam groups) having a similarity/common value in terms of the specific characteristic.

According to an embodiment, a "panel" may be defined as a unit for a UE to configure a transmission/reception beam. For example, a "transmission panel (Tx panel)" may be defined as a unit in which a plurality of candidate transmission beams can be generated by one panel, but only one of the beams can be used for transmission at a specific time (that is, only one transmission beam (spatial relation information RS) can be used per Tx panel in order to transmit a specific uplink signal/channel).

According to an embodiment, a "panel" may refer to "a plurality antenna ports (or at least one antenna port)", a "antenna port group" or an "uplink resource group (or set)" with common/similar uplink synchronization. Here, the "panel" may be interpreted/applied by being transformed into a generalized expression of "uplink synchronization unit (USU)". Alternatively, the "panel" may be interpreted/applied by being transformed into a generalized expression of "uplink transmission entity (UTE)".

Additionally, the "uplink resource (or resource group)" may be interpreted/applied by being transformed into a resource (or a resource group (set)) of a physical uplink shared channel (PUSCH)/physical uplink control channel (PUCCH)/sounding reference signal (SRS)/physical random access channel (PRACH). Conversely, a resource (resource group) of a PUSCH/PUCCH/SRS/PRACH may be interpreted/applied as an "uplink resource (or resource group)" based on the definition of the panel.

In the present disclosure, an "antenna (or antenna port)" may represent a physical or logical antenna (or antenna port).

As described above, a "panel" referred to in the present disclosure can be interpreted in various ways as "a group of UE antenna elements", "a group of UE antenna ports", "a group of logical antennas", and the like. Which physical/logical antennas or antenna ports are mapped to one panel may be variously changed according to position/distance/correlation between antennas, an RF configuration and/or an antenna (port) virtualization method. The phaming process may vary according to a UE implementation method.

In addition, the "panel" referred to in the present disclosure may be interpreted/applied by being transformed into "a plurality of panels" or a "panel group" (having similarity in terms of specific characteristics).

Hereinafter, matters related to implementation of a multi-panel will be described.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 11 and 12.

FIG. 11 and FIG. 12 illustrate an example of multi-panel based on an RF switch applied to the disclosure.

A plurality of panels may be implemented based on an RF switch.

Referring to FIG. 11, only one panel may be activated at a time, and signal transmission may be impossible for a predetermined time during which the activated panel is changed (i.e., panel switching).

FIG. 12 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (ST×MP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 12, the concept described above in connection with the SRS resource set may be directly applied to the SRS resource group. When considering panel switching according to the panel implementation scheme according to FIG. 11, an SRS resource group may be defined separately from the SRS resource set.

For example, a specific ID may be assigned to each SRS resource such that resources having the same ID belong to the same SRS resource group (SRS resource group) and resources having different IDs belong to different resource groups.

For example, when four SRS resource sets (e.g., RRC parameter usage is configured to 'Beam Management') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

With respect to multi-panel transmission, UE category information may be defined in order for a UE to report performance information thereof related to multi-panel transmission. As an example, three multi-panel UE (MPUE) categories may be defined, and the MPUE categories may be classified according to whether a plurality of panels can be activated and/or whether transmission using a plurality of panels is possible.

In the case of the first MPUE category (MPUE category 1), in a UE in which multiple panels are implemented, only one panel may be activated at a time, and a delay for panel switching and/or activation may be set to [X]ms. For example, the delay may be set to be longer than a delay for beam switching/activation and may be set in units of symbols or slots.

In the case of the second MPUE category (MPUE category 2), in a UE in which multiple panels are implemented, multiple panels may be activated at a time, and one or more panels may be used for transmission. That is, simultaneous transmission using panels may be possible in the second MPUE category.

In the case of the third MPUE category (MPUE category 3), in a UE in which multiple panels are implemented, multiple panels may be activated at a time, but only one panel may be used for transmission.

With respect to multi-panel-based signal and/or channel transmission/reception proposed in the present disclosure, at least one of the three MPUE categories described above may be supported. For example, in Rel-16, MPUE category 3 among the following three MPUE categories may be (optionally) supported.

In addition, information on an MPUE category may be predefined on the standards or semi-statically configured according to a situation in a system (i.e., a network side or a UE side) and/or dynamically indicated. In this case, configuration/indication related to multi-panel-based signal and/or channel transmission/reception may be performed in consideration of the MPUE category.

Hereinafter, matters related to configuration/indication related to panel-specific transmission/reception will be described.

With respect to a multi-panel-based operation, transmission and reception of signals and/or channels may be panel-specifically performed. Here, "panel-specific" may mean that transmission and reception of signals and/or channels in units of panels can be performed. Panel-specific transmission/reception may also be referred to as panel-selective transmission/reception.

With respect to panel-specific transmission and reception in the multi-panel-based operation proposed in the present disclosure, a method of using identification information (e.g., an identifier (ID), an indicator, etc.) for setting and/or indicating a panel to be used for transmission and reception among one or more panels may be considered.

As an example, an ID for a panel may be used for panel selective transmission of a PUSCH, a PUCCH, an SRS, and/or a PRACH among a plurality of activated panels. The ID may be set/defined based on at least one of the following four methods (Alts 1, 2, 3, and 4).

Alt.1: ID for a panel may be an SRS resource set ID.

As an example, when the aspects according to a) to c) below are considered, it may be desirable that each UE Tx panel correspond to an SRS support set that is set in terms of UE implementation.

a) SRS resources of multiple SRS resource sets having the same time domain operation are simultaneously transmitted in the same bandwidth part (BWP).
b) Power control parameters are set in units of SRS resource sets.
c) A UE reports a maximum of 4 SRS resource sets (which may correspond to up to 4 panels) according to A supported time domain operation.

In the case of Alt.1 method, an SRS resource set related to each panel may be used for "codebook" and "non-codebook" based PUSCH transmission. In addition, a plurality of SRS resources belonging to a plurality of SRS resource sets may be selected by extending an SRI field of DCI. A mapping table between a sounding reference signal resource indicator (SRI) and an SRS resource may need to be extended to include the SRS resource in all SRS resource sets.

Alt.2: ID for a panel may be an ID (directly) associated with a reference RS resource and/or a reference RS resource set.

Alt.3: ID for a panel may be an ID directly associated with a target RS resource (reference RS resource) and/or a reference RS resource set.

In the case of Alt.3 method, configured SRS resource set(s) corresponding to one UE Tx panel can be controlled more easily, and the same panel identifier can be allocated to a plurality of SRS resource sets having different time domain operations.

Alt.4: ID for a panel may be an ID additionally set in spatial relation info (e.g., RRC parameter (SpatialRelationInfo)).

The Alt.4 method may be a method of newly adding information for indicating an ID for a panel. In this case, configured SRS resource set(s) corresponding to one UE Tx panel can be controlled more easily, and the same panel identifier can be allocated to a plurality of SRS resource sets having different time domain operations.

As an example, a method of introducing a UL TCI similarly to the existing DL TCI (Transmission Configuration Indication) may be considered. Specifically, UL TCI state definition may include a list of reference RS resources (e.g., SRS, CSI-RS and/or SSB). The current SRI field may be reused to select a UL TCI state from a configured set. Alternatively, a new DCI field (e.g., UL-TCI field) of DCI format 0_1 may be defined for the purpose of indicating the UL TCI state.

Information (e.g., panel ID, etc.) related to the above-described panel-specific transmission and reception can be transmitted via higher layer signaling (e.g., RRC message, MAC-CE, etc.) and/or lower layer signaling (e.g., L1 signaling, DCI, etc.). The information may be transmitted from a base station to a UE or from the UE to the base station according to circumstances or as necessary.

Further, the corresponding information may be set in a hierarchical manner in which a set for a candidate group is set and specific information is indicated.

Further, the above-described panel-related identification information may be set in units of a single panel or in units of multiple panels (e.g., a panel group or a panel set).

Uplink Power Control

In a wireless communication system, transmission power of a terminal (e.g., user equipment (UE) and/or a mobile device may be required to increase or decrease according to a situation. As such, controlling the transmission power of the UE and/or the mobile device may be referred to as uplink power control. As an example, a transmission power control method may be applied to meet requirements (e.g., signal-to-noise Ratio (SNR), bit error ratio (BER), block error ratio (BLER), etc.) in a base station (e.g., gNB, eNB, etc.).

The power control described above may be performed by an open-loop power control method and a closed-loop power control method.

Specifically, the open-loop power control method means a method of controlling the transmission power without a feedback from a transmitting device (e.g., base station, etc.) to a receiving device (e.g., UE, etc.) and/or a feedback from the receiving device to the transmitting device. As an example, the UE may receive a pilot channel/signal from the base station and estimate a strength of reception power by using the received pilot channel/signal. Thereafter, the UE may control the transmission power by using the estimated strength of the reception power.

On the other hand, the closed-loop power control method means a method of controlling the transmission power based on the feedback from the transmitting device to the receiving device and/or the feedback from the receiving device to the transmitting device. As an example, the base station receives the pilot channel/signal from the UE and determines an optimum power level of the UE based on a power level, SNR, BEER, BLER, etc., measured by the received pilot channel/signal. The base station may transfer information (i.e., feedback) on the determined optimum power level to the UE via a control channel, and the corresponding UE may control the transmission power using the feedback provided by the base station.

Hereinafter, a power control method for cases where the UE and/or the mobile device performs uplink transmission to the base station in the wireless communication system will be described in detail.

Power Control of Uplink Data Channel

Hereinafter, for convenience of description, the power control method will be described based on the case where the UE performs PUSCH transmission. It is obvious that the corresponding method may be extensively applied to another uplink data channel supported in the wireless communication system.

In PUSCH transmission in an active uplink (UL) bandwidth part (BWP) of carrier f of serving cell c, the UE may calculate a linear power value of the transmission power determined by Equation 3 below. Thereafter, the corresponding UE may control the transmission power considering the calculated linear power value, the number of antenna ports, and/or the number of SRS ports.

Specifically, when the UE performs PUSCH transmission in active UL BWP(b) of carrier f of serving cell c using a parameter set configuration based on index j and a PUSCH power control adjustment state based on index l, the UE may determine PUSCH transmission power $P_{PUSCH,b,f,c}(i,j,q_d,l)$ (dBm) in PUSCH transmission occasion i based on Equation 3 below.

[Equation 3]

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases} [dbm]$$

In Equation 3, index j denotes an index for an open loop power control parameter (e.g., Po, alpha (α), etc.), and up to 32 parameter sets per cell may be configured. Index q_d denotes an index of a DL RS resource for pathloss (PL) measurement (e.g., $PL_{b,f,c}(q_d)$, and up to four measurement values per cell may be configured. Index l denotes an index for a closed-loop power control process, and up to two processes per cell may be configured.

Specifically, Po (e.g., $P_{O\_PUSCHb,f,c}(j)$) as a parameter broadcasted to a part of system information may represent target received power at a receiving side. The corresponding Po value may be configured considering a throughput of the UE, a capacity of the cell, a noise, and/or interference. Further, an alpha (e.g., $\alpha_{b,f,c}(j)$) may represent a ratio of performing compensation for pathloss. The alpha may be set to a value between 0 and 1, and a full pathloss compensation or a fractional pathloss compensation may be performed according to the set value. In this case, the alpha value may be set considering interference between the UEs and/or a data speed. Further, $P_{CMAX,f,c}(i)$ may represent configured UE transmit power. As an example, the configured UE transmit power may be construed as 'configured maximum UE output power' defined in 3GPP TS 38.101-1 and/or TS38.101-2. Further, $M_{RB,b,f,c}^{PUSCH}(i)$ may represent a bandwidth of PUSCH resource allocation expressed as the number of resource blocks (RBs) for a PUSCH transmission occasion based on subcarrier spacing μ. Further, $f_{b,f,c}(i,l)$ related to a PUSCH power control adjustment state may be configured or indicated based on a TPC command field of DCI (e.g., DCI format 0_0, DCI format 0_1, DCI format 2_2, DCI format 2_3, etc.).

In this case, a specific radio resource control (RRC) parameter (e.g., SRI-PUSCHPowerControl-Mapping, etc.) may represent a linkage between the SRS resource indicator (SRI) field of downlink control information (DCI) and the indexes j, q_d, and 1. In other words, the indexes j, 1, and q_d may be associated with a beam, a panel, and/or a spatial domain transmission filter based on specific information. Therefore, the PUSCH transmission power control in units of beam, panel, and/or spatial domain transmission filter may be performed.

Parameters and/or information for the PUSCH power control may be individually (i.e., independently) configured for each BWP. In this case, the parameters and/or information may be configured or indicated via higher layer signaling (e.g., RRC signaling, medium access control-control element (MAC-CE), etc.) and/or DCI. As an example, the parameter and/or information for the PUSCH power control may be transferred via RRC signaling PUSCH-ConfigCommon, PUSCH-PowerControl, etc., and PUSCH-ConfigCommon and PUSCH-PowerControl may be configured as shown in Table 8 below.

substituted with some components of another method or may be applied in combination therewith.

In Rel-15 NR, spatial related information (spatialRelationInfo) is used in order for a BS to indicate a transmission beam to be used when the BS transmits an UL channel to a UE. Specifically, the BS may configure a DL reference signal (e.g., SSB-RI, CRI (P/SP/AP)) or an SRS (i.e., SRS resource) as a reference RS for a target UL channel or a target RS through RRC configuration. Through the configuration, the BS may indicate which UL transmission beam will be used when transmitting a PUCCH/SRS. A transmission beam of an SRS transmitted through the indication may be indicated as a transmission beam for a PUSCH through an SRI field when a BS schedules a PUSCH for a UE and is used as a PUSCH transmission beam of the UE.

An UL MIMO transmission scheme for PUSCH transmission in Rel-15 NR is divided into two types. Specifically, a PUSCH transmission scheme may be based on a codebook based scheme ((CB) UL) or a non-codebook based scheme ((NCB) UL).

Hereinafter, in the disclosure, the "transmission of an SRS resource set" may be used as the same meaning as that "an SRS is transmitted based on information configured in an SRS resource set" and "transmitting an SRS resource" or "transmitting SRS resources" may be used as the same meaning as that "an SRS or SRSs are transmitted based on information configured in an SRS resource.".

First, in the case of the CB UL, a BS may first configure and/or indicate, for a UE, the transmission of an SRS resource set for a "CB" purpose. The UE may transmit an n port SRS resource within a corresponding SRS resource set.

TABLE 8

```
PUSCH-ConfigCommon : :=              SEQUENCE {
    groupHoppingEnabledTransformPrecoding    ENUMERATED {enabled}
    pusch-TimeDomainAllocationList           PUSCH-TimeDomainResourceAllocationList
    msg3-DeltaPreamble                       INTEGER (–1 . . . 6)
    p0-NominalWithGrant                      INTEGER (–202 . . . 24)
    . . .
}
PUSCH-PowerControl : :=              SEQUENCE {
    tpc-Accumulation                         ENUMERATED { disabled }
    msg3-Alpha                               Alpha
    p0-NominalWithoutGrant                   INTEGER (–202 . . . 24)
    p0-AlphaSets                             SEQUENCE (SIZE (1 . . . maxNrofP0-PUSCH-AlphaSets)) OF P0-
PUSCH-AlphaSet
    pathlossReferenceRSToAddModList                    SEQUENCE (SIZE (1 . . . maxProfPUSCH-
PathlossReferenceRSs) ) OF PUSCH-PathlossReferenceRS
    pathlossReferenceRSToReleaseList                   SEQUENCE (SIZE (1 . . . maxProfPUSCH-
PathlossReferenceRSs) ) OF PUSCH-PathlossReferenceRS-Id
    twoPUSCH-PC-AdjustmentStates    ENUMERATED {twoStates}
    deltaMCS                        ENUMERATED {enabled}
    sri-PUSCH-MappingToAddModList            SEQUENCE (SIZE (1 . . . maxProfSRI-PUSCH-Mappings)) OF
SRI-PUSCH-PowerControl
    sri-PUSCH-MappingToReleaseList           SEQUENCE (SIZE (1 . . . maxProfSRI-PUSCH-Mappings)) OF
SRI-PUSCH-PowerControlId
}
```

The UE may determine or calculate the PUSCH transmission power through the above-described method and transmit PUSCH using the determined or calculated PUSCH transmission power.

The above description (3GPP system, frame structure, NR system, etc.) can be applied in combination with methods proposed in the present disclosure which will be described later or supplemented to clarify the technical characteristics of the methods proposed in the present disclosure. The methods described below are only divided for convenience of description, and some components of one method may be The BS may obtain an UL channel based on the corresponding SRS transmission, and may use the UL channel for the PUSCH scheduling of the UE. Thereafter, the BS may perform PUSCH scheduling through UL DCI, and may indicate a PUSCH (transmission) beam of the UE by indicating, through an SRI field of the DCI, the SRS resource for a "CB" purpose, which has been previously transmitted by the UE. Furthermore, the BS may indicate an UL rank and an UL precoder by indicating an uplink codebook through a TPMI field. Accordingly, the UE may perform PUSCH transmission based on corresponding indication.

Next, even in the case of the NCB UL, a BS may first configure and/or indicate, for a UE, the transmission of an SRS resource set for a "non-CB" purpose. The UE may determine a precoder of SRS resources (a maximum of four resources, one port per resource) within the corresponding SRS resource set based on the reception of a NZP CSI-RS connected to the corresponding SRS resource set, and may simultaneously transmit corresponding SRS resources. Thereafter, the BS may perform PUSCH scheduling through UL DCI, and may indicate a PUSCH (transmission) beam of the UE by indicating, through an SRI field of the DCI, some of the SRS resources for a "non-CB" purpose, which have previously been transmitted by the UE, and may simultaneously indicate an UL rank and an UL precoder. Accordingly, the UE can perform PUSCH transmission based on corresponding indication.

Hereinafter, an agreement related to an UL transmission configuration indicator (UL-TCI) is described.

A BS may configure/indicate panel-specific transmission for UL transmission for UL transmission through the following Alt.2 or Alt.3.

Alt.2: an UL-TCI framework is introduced, and UL-TCI-based signaling similar to DL beam indication supported in Rel-15 is supported.

A new panel ID may or may not be introduced.

A panel specific signaling is performed using UL-TCI state.

Alt.3: a new panel-ID is introduced. The corresponding panel-ID may be implicitly/explicitly applied to the transmission of a target RS resource/resource set, a PUCCH resource, an SRS resource or a PRACH resource.

A panel-specific signaling is performed implicitly (e.g., by DL beam reporting enhancement) or explicitly by using a new panel ID.

When signaling is explicitly performed, a panel-ID may be configured in a target RS/channel or a reference RS (e.g., DL RS resource configuration or spatial relation info).

For the panel ID, a new MAC CE may not be designated.

Table 9 below illustrates UL-TCI states based on the Alt.2.

TABLE 9

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource for a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

As in the agreement, an UL-TCI is considered as an integrated framework which enables a BS to indicate a transmission panel/beam in an UL channel of a UE. This has a form in which DL-TCI has been extended in uplink in the existing Rel-15 NR.

A DL RS (e.g., SSB-RI, CRI) or an UL RS (e.g., SRS) is configured as a reference RS or a source RS to be used/applied as transmission beam for a target UL channel (e.g., PUCCH, PUSCH, PRACH) or a target UL RS (e.g., SRS) through an UL-TCI configuration (e.g., RRC signaling). A UE may use a corresponding reference transmission beam upon corresponding target channel/RS transmission.

The UL-TCI framework has the same purpose as a framework structure called spatialRelationInfo in the existing Rel-15. However, the UL-TCI framework has an advantage in that it can reduce overhead and delay compared to the existing scheme if a PUSCH beam is indicated. The reason for this is that in the case of the existing scheme, an SRS for a "CB" or "non-CB" purpose must be transmitted before an SRI is indicated for PUSCH transmission. Furthermore, the UL-TCI framework also has a meaning in constructing an integrated transmission beam indication method for all UL channels, such as a PUCCH/PUSCH/SRS.

In relation to the multi-panel-based transmission of a UE, the following scheme may be considered.

i) The multi-panel transmission of a UE transparent (i.e., not recognized by the UE/BS) between the UE and the BS ii) Panel switching UL transmission and/or multi-panel simultaneous UL transmission (corresponding transmission may be configured/indicated/scheduled by a BS) performed in the state in which the BS and a UE have recognized each multi-panel of the UE The aforementioned UE operation may be considered even in UL RS transmission as well as in the uplink data transmission (e.g., PUSCH) of a UE. In particular, the disclosure proposes an SRS configuration and PUSCH transmission method for a simultaneous transmission across multi-panel (ST×MP) in the multi-panel of a UE.

ST×MP PUSCH transmission may be divided into two schemes from a viewpoint of a transmission stage. Specifically, ST×MP PUSCH transmission may be divided into 1) a scheme for transmitting the same PUSCH in the form of a single frequency network (SFN) for each panel of a UE and 2) a scheme for separately transmitting different PUSCHs for each panel of a UE.

Furthermore, ST×MP PUSCH transmission may be divided into two schemes from a viewpoint of a reception stage. Specifically, an ST×MP PUSCH may be divided into 1) whether it is directed toward one transmission reception point (TRP) (e.g., UL Tx for a single TRP) or 2) whether it is directed toward two or more TRPs (e.g., UL Tx for multiple TRPs).

Hereinafter, in embodiments described in the disclosure, layer split ST×MP PUSCH transmission toward one TRP is assumed for convenience of description. However, the application of the embodiments of the disclosure to another assumption is not excluded, and a method(s) according to embodiments of the disclosure may be extended and applied to several scenarios. Furthermore, an ultra-reliable low latency communications (URLLC) scenario as well as an enhanced mobile broadband (eMBB) scenario may also be considered as a target scenario of a method(s) described in the disclosure.

A basic motivation, that is, a technical object, of layer split ST×MP PUSCH transmission toward one TRP, that is, may be as follows.

A maximum of UL MIMO ranks of a UE supported in the NR Rel-15 RAN1 standard is 4 (four layers). However, in an actual wireless channel, the following limit is present in relation to a rank which may be secured by a UE upon UL transmission. Rank 2 transmission using cross-polarization may be a limit because sufficient angular spread in an angle of departure (AoD) is not guaranteed due to the number of limited antennas of a UE and the distance between antennas. A scheme for configuring, as 2, the number of Tx antenna ports assumed in an actual UE implementation in RAN 4 is considered.

If a multi-panel of a UE which may be controlled by a BS is implemented, the UE may transmit the same PUSCH in an SFN form through each panel. The UE may transmit different PUSCHs having independent layers in each panel. Accordingly, angular spread can be forcedly increased using a multi-panel (targeted for an eMBB scenario). Furthermore, rank 2 or more of a multi-rank can be effectively supported in a multi-panel.

The disclosure proposes an SRS configuration method for scheduling, by a BS, STxMP PUSCH transmission for a UE, and describes a subsequent STxMP PUSCH transmission scheduling method of a BS and a subsequent STxMP PUSCH transmission method of a UE.

[Proposal 1]

If a BS schedules an STxMP PUSCH, the corresponding BS may schedule total layers as two or more PUSCHs by splitting the total layers for each panel of a UE. In this case, a method of measuring, by the BS, interference between UE panels upon UL transmission of the UE is described. Specifically, a method of permitting simultaneous transmission for SRS resources from UE panels and supporting a simultaneous transmission SRS (i.e., STxMP SRS) (SRS configuration method between the BS and the UE) is described.

Hereinafter, methods described in Proposal 1 may be related to a higher layer configuration for the transmission of an STxMP PUSCH. For example, Proposal 1 may be for configuration information based on RRC signaling, etc.

Methods to be described hereinafter are divided merely for convenience of description. Some elements of any method may be substituted with some elements of another method or one or more methods may be mutually combined and applied.

Furthermore, "SRS resources from UE panels" described in the disclosure may mean SRS resources configured/assigned to be transmitted through each panel of a UE. That is, "permitting simultaneous transmission for SRS resources from UE panels" may mean that the simultaneous transmission of SRS resources configured/assigned in the panels of the UE is permitted.

[Method 1-1]

A simultaneous transmission across multi-panel SRS (STxMP SRS) may be configured based on the usage of the corresponding SRS. As a detailed example, a new usage parameter may be added to the "usage" of an SRS resource set. The new usage parameter may be denoted as "multi-panel UL" or "simultaneous transmission across multi-panel UL (STxMP-UL)." This is merely an example, and the new usage parameter may be denoted another term. According to the example, the simultaneous transmission of SRS resources from each UE panel may be permitted within an SRS resource set whose usage is configured as "multi-panel UL" or "STxMP-UL", etc. related to multi-panel transmission.

The following method may be additionally considered on the premise that a "Panel-ID" of a UE is defined. Each of SRS resources within a corresponding SRS resource set may have a "Panel-ID" as a sub-parameter. The UE may determine a panel through which the SRS resource will be transmitted through a corresponding "Panel-ID" value. Alternatively, if the aforementioned UL-TCI state (refer to Table 7) (instead of spatialRelationInfo) is used (i.e., if an UL TCI framework is used), the "Panel-ID" may be designated and an SRS transmission beam may also be designated by configuring/indicating a specific UL-TCI state index in an UL-TCI state field included in each SRS resource IE.

A method of defining/configuring/indicating the panel of a UE is specifically illustrated in Table 10 and Table 11.

TABLE 10

```
SRS-Resource ::= SEQUENCE {
    srs-ResourceId         SRS-ResourceId,
    panel-Identifier       Panel-Id
    nrofSRS-Ports          ENUMERATED {port1, ports2, ports4},
    ptrs-PortIndex         ENUMERATED {n0, n1 }
                           OPTIONAL, -- Need R
    ...
}
or,
SRS-Resource ::= SEQUENCE {
    srs-ResourceId         SRS-ResourceId,
    nrofSRS-Ports          ENUMERATED {port1, ports2, ports4},
    ptrs-PortIndex         ENUMERATED {n0, n1 }
                           OPTIONAL, -- Need R
    ...
    sequenceId             INTEGER (0 ... 1023),
    spatialRelationInfo    SRS-SpatialRelationInfo
                           OPTIONAL, -- Need R
    ...
}
SRS-SpatialRelationInfo ::= SEQUENCE {
    servingCellId          ServCellIndex OPTIONAL, -- Need S
    panel-Identifier       Panel-Id
    referenceSignal        CHOICE {
        ssb-Index SSB-Index,
        csi-RS-Index NZP-CSI-RS-ResourceId,
        srs                SEQUENCE {
            resourceId     SRS-ResourceId,
            uplinkBWP      BWP-Id
        }
    }
}
```

TABLE 11

```
SRS-Resource ::= SEQUENCE {
    srs-ResourceId              SRS-ResourceId,
    nrofSRS-Ports               ENUMERATED {port1, ports2, ports4},
    ptrs-PortIndex              ENUMERATED {n0, n1 }
                                OPTIONAL, -- Need R
    ...
    spatialRelationInfo or ul-tciInfo      UL-TCI-State
    ...
}
UL-TCI-State ::= SEQUENCE {
    ul-tci-StateId              UL-TCI-StateId,
    panel-Identifier            Panel-Id,
    [qcl-Type]                  [QCL-Info]
    ...
}
```

Table 10 and Table 11 illustrate RRC configurations. Specifically, Table 10 illustrates an SRS configuration based on spatial related information (spatialRelationinfo). Table 11 illustrates an SRS configuration based on an UL-TCI state. The RRC configurations according to Table 10 and Table 11 are merely examples for convenience of description, and an implementation of the present embodiment is not limited to the aforementioned examples.

Additionally, SRS resources within an SRS resource set whose "usage" has been configured as "multi-panel UL" or "STxMP-UL" may be configured to have specific sub-parameters have the same value. That is, SRS resources included in an SRS resource set configured as usage related to multi-panel transmission may be based on common parameter restrictions (proposal on common parameter restrictions). In other words, the SRS resources may be configured based on the common parameter restrictions.

For example, the following parameters may be common to SRS resources included in an SRS resource set.

A frequency domain position, a frequency domain shift, whether frequency hopping is present or not, a hopping pattern, a time domain behavior (e.g., periodic, aperiodic, semi-persistent), a time domain symbol(s)/location and/or a repetition factor (e.g., R)

Upon UL transmission of a UE before STxMP PUSCH scheduling, the common parameter restrictions used by a BS to check interference between panels may be applied. Specifically, parameters for configuring simultaneous transmission with respect to SRS transmission in each panel may be based on the common parameter restrictions.

For example, a parameter to which the common parameter restrictions are applied may be parameters related to a configuration of a time/frequency domain resource.

A simultaneous transmission across multi-panel SRS based on the common parameter restrictions has the following effect. Specifically, if a UE simultaneously transmits SRS resources through multi-panels based on the common parameter restrictions, a BS can measure interference between the panels of the UE.

Table 12 illustrates parameters based on the common parameter restrictions.

TABLE 12

```
resourceMapping              SEQUENCE {
  startPosition                INTEGER (0 . . . 5),
  nrofSymbols                  ENUMERATED {n1, n2, n4},
  repetitionFactor             ENUMERATED {n1, n2, n4}
},
freqDomainPosition             INTEGER (0 . . . 67),
freqDomainShift                INTEGER (0 . . . 268),
freqHopping                    SEQUENCE {
  c-SRS                        INTEGER (0 . . . 63),
  b-SRS                        INTEGER (0 . . . 3),
  b-hop                        INTEGER (0 . . . 3)
},
groupOrSequenceHopping ENUMERATED { neither, groupHopping, sequenceHopping },
resourceType CHOICE {
  aperiodic SEQUENCE {
    . . .
  },
  semi-persistent SEQUENCE {
    periodicityAndOffset-sp SRS-PeriodicityAndOffset,
    . . .
  },
  periodic SEQUENCE {
    periodicityAndOffset-p SRS-PeriodicityAndOffset,
    . . .
  }
},
```

Contrary, sub-parameters excluded from the common parameter restrictions may include at least one of [comb value], nrofSRS-Ports, ptrs-PortIndex, [sequence generation related parameters], or spatialRelationInfo.

For example, in a parameter, such as nrofSRS-Ports meaning the number of SRS ports of each panel for each SRS resource, the number of SRS transmission ports for each panel of a UE may be differently configured by excluding the common parameter restrictions. Accordingly, a BS may obtain preliminary channel information for optimal STxMP PUSCH layer splitting.

In particular, in the case of a parameter such as spatial related information (spatialRelationInfo), multiple values corresponding to the number of UE panels may be designed/ configured as an RRC sub-parameter for each SRS resource by excluding the parameter from the common parameter restrictions. In this case, a BS may select whether to configure the same value (e.g., a single DL RS for each spatialRelationInfo) or another value (e.g., two different SRS ID(usage="BM") for each spatialRelationInfo) in each parameter.

Table 13 illustrates parameters (e.g., dedicated/uncommon parameter) excluded from the common parameter restrictions.

TABLE 13

```
nrofSRS-Ports         ENUMERATED {port1, ports2, ports4},
ptrs-PortIndex        ENUMERATED {n0, n1 } OPTIONAL,
                      -- Need R
transmissionComb CHOICE {
  n2 SEQUENCE {
    combOffset-n2     INTEGER (0 . . . 1),
    cyclicShift-n2    INTEGER (0 . . . 7)
  },
  n4 SEQUENCE {
    combOffset-n4    INTEGER (0 . . . 3),
    cyclicShift-n4   INTEGER (0 . . . 11)
  }
},
sequenceId            INTEGER (0 . . . 1023),
spatialRelationInfo   SRS-SpatialRelationInfo OPTIONAL,
                      -- Need R
```

In the disclosure, a common parameter based on the common parameter restrictions may be denoted as a first parameter, and a parameter (dedicated/uncommon parameter) excluded from the common parameter restrictions may be denoted as a second parameter.

[Method 1-2]

A simultaneous transmission across multi-panel SRS (STxMP SRS) may be configured based on the grouping/pairing of an SRS resource.

For example, grouping for UL STxMP transmission is performed on specific SRS resources within an SRS resource set. Simultaneous transmission from each UE panel may be permitted with respect to the SRS resources within the corresponding group.

For another example, pairing may be performed on specific SRS resources. Specifically, simultaneous transmission from each UE panel may be permitted with respect to SRS resources included in a corresponding pair in a paired SRS resource form.

The following method may be additionally considered on the premise that a "Panel-ID" of a UE is defined. Each of SRS resources within a corresponding group and/or pair may have a "Panel-ID" as a sub-parameter. The UE may determine a panel through which the SRS resource will be transmitted through the corresponding "Panel-ID" value. Alternatively, if the aforementioned UL-TCI state (refer to Table 7) (instead of spatialRelationInfo) is used (i.e., if an UL TCI framework is used), a "Panel-ID" may be designated and an SRS transmission beam may also be designated by configuring/indicating a specific UL-TCI state index in an UL-TCI state field included in each SRS resource IE.

A method of defining/configuring/indicating the panel of a UE is specifically illustrated in Table 14 and Table 15.

TABLE 14

```
SRS-Resource : := SEQUENCE {
    srs-ResourceId              SRS-ResourceId,
    panel-Identifier            Panel-Id
    nrofSRS-Ports                 ENUMERATED {port1, ports2, ports4},
    ptrs-PortIndex                 ENUMERATED {n0, n1 } OPTIONAL, -- Need R
    . . .
    }
or,
SRS-Resource : := SEQUENCE {
    srs-ResourceId              SRS-ResourceId,
    nrofSRS-Ports                 ENUMERATED {port1, ports2, ports4},
    ptrs-PortIndex                 ENUMERATED {n0, n1 } OPTIONAL, -- Need R
    . . .
    sequenceId                       INTEGER (0 . . . 1023),
    spatialRelationInfo          SRS-SpatialRelationInfo OPTIONAL, -- Need R
    . . .
    }
SRS-SpatialRelationInfo : := SEQUENCE {
    servingCellId                ServCellIndex OPTIONAL, -- Need S
    panel-Identifier            Panel-Id
    referenceSignal                 CHOICE {
        ssb-Index SSB-Index,
        csi-RS-Index NZP-CSI-RS-ResourceId,
        srs                         SEQUENCE {
            resourceId        SRS-ResourceId,
            uplinkBWP         BWP-Id
        }
    }
}
```

TABLE 15

```
SRS-Resource : := SEQUENCE {
    srs-ResourceId              SRS-ResourceId,
    nrofSRS-Ports                 ENUMERATED {port1, ports2, ports4},
    ptrs-PortIndex                 ENUMERATED {n0, n1 }
                                    OPTIONAL, -- Need R
    . . .
    spatialRelationInfo or ul-tciInfo          UL-TCI-State
    . . .
    }
UL-TCI-State : := SEQUENCE {
    ul-tci-StateId              UL-TCI-StateId,
    panel-Identifier            Panel-Id,
    [qcl-Type]                  [QCL-Info]
    . . .
}
```

Table 14 and Table 15 illustrate RRC configurations. Specifically, Table 14 illustrates an SRS configuration based on spatial related information (spatialRelationinfo). Table 15 illustrates an SRS configuration based on an UL-TCI state. The RRC configuration according to Table 14 and Table 15 are merely examples for convenience of description. An implementation of the present embodiment is not limited to the aforementioned examples.

SRS resources within the group and/or SRS resources within the pair may be configured to have specific sub-parameters have the same value. That is, the SRS resources within the group and/or the pair may be based on common parameter restrictions (proposal on common parameter restrictions).

For example, the following parameters may be common to SRS resources within a group and/or a pair. That is, the following parameters may be the first parameters.

A frequency domain position, a frequency domain shift, whether frequency hopping is present or not, a hopping pattern, a time domain behavior (e.g., periodic, aperiodic, semi-persistent), a time domain symbol(s)/location, a repetition factor (e.g., R)

The common parameter restrictions used by a BS to check interference between panels upon UL transmission of a UE before multi-panel simultaneous transmission PUSCH scheduling (ST×MP PUSCH scheduling) may be applied.

Specifically, parameters for configuring simultaneous transmission may be based on the common parameter restrictions with respect to SRS transmission in each panel.

For example, a parameter (first parameter) to which the common parameter restrictions are applied may be parameters related to a configuration of a time/frequency domain resource.

A simultaneous transmission across multi-panel SRS based on the common parameter restrictions has the following effect. Specifically, if a UE simultaneously transmits SRS resources through multi-panels based on the common parameter restrictions, a BS can measure interference between the panels of the UE.

Table 16 illustrates parameters based on the common parameter restrictions.

TABLE 16

```
resourceMapping            SEQUENCE {
  startPosition              INTEGER (0 . . . 5),
  nrofSymbols                ENUMERATED {n1, n2, n4},
  repetitionFactor           ENUMERATED {n1, n2, n4}
},
freqDomainPosition         INTEGER (0 . . . 67),
freqDomainShift            INTEGER (0 . . . 268),
freqHopping                SEQUENCE {
  c-SRS                      INTEGER (0 . . . 63),
  b-SRS                      INTEGER (0 . . . 3),
  b-hop                      INTEGER (0 . . . 3)
},
groupOrSequenceHopping ENUMERATED {neither, groupHopping,
sequenceHopping },
resourceType CHOICE {
  aperiodic SEQUENCE {
    . . .
  },
  semi-persistent SEQUENCE {
    periodicity AndOffset-sp SRS-PeriodicityAndOffset,
    . . .
  },
  periodic SEQUENCE {
    periodicity AndOffset-p SRS-PeriodicityAndOffset,
    . . .
  }
},
```

Contrary, sub-parameters (second parameters) excluded from common parameter restrictions may include at least one of [comb value], nrofSRS-Ports, ptrs-PortIndex, [sequence generation related parameters], or spatialRelationInfo.

For example, in the case of a parameter such as nrofSRS-Ports meaning the number of SRS ports of each panel for each SRS resource, the number of SRS transmission ports for each panel of a UE may be differently configured by excluding the parameter from the common parameter restrictions. Accordingly, a BS may obtain preliminary channel information for optimal STxMP PUSCH layer splitting.

In particular, in the case of a parameter such as spatial related information (spatialRelationInfo), multiple values corresponding to the number of the UE panels may be designed/configured as an RRC sub-parameter for each SRS resource by excluding the parameter from the common parameter restrictions. In this case, a BS may select whether to configure the same value (e.g., a single DL RS for each spatialRelationInfo) or another value (e.g., two different SRS ID(usage="BM") for each spatialRelationInfo) in each parameter.

Table 17 illustrates parameters (e.g., dedicated/uncommon parameter) excluded from the common parameter restrictions.

TABLE 17

```
nrofSRS-Ports            ENUMERATED {port1, ports2, ports4},
ptrs-PortIndex           ENUMERATED {n0, n1 }
                         OPTIONAL, -- Need R
transmissionComb CHOICE {
  n2 SEQUENCE {
    combOffset-n2           INTEGER (0 . . . 1),
    cyclic Shift-n2         INTEGER (0 . . . 7)
  },
```

TABLE 17-continued

```
  n4 SEQUENCE {
    combOffset-n4           INTEGER (0 . . . 3),
    cyclic Shift-n4         INTEGER (0 . . . 11)
  }
},
sequenceId               INTEGER (0 . . . 1023),
spatialRelationInfo      SRS-SpatialRelationInfo OPTIONAL, -- Need R
```

[Method 1-3]

A simultaneous transmission across multi-panel SRS (STxMP SRS) may be based on a specific SRS resource.

As a detailed example, a parameter of a specific SRS resource in which an ID (e.g., global ID, common ID, etc.) which may be in common configured with respect to a plurality of panels has been configured or an SRS resource configured/designated as STxMP usage (among all SRS resources) may be configured as follows.

A specific sub-parameter(s) included in the aforementioned SRS resource may be configured to have multiple values. The multiple values may be configured as information which is different depending on each UE panel. Furthermore, information for the multiple values may be configured to be shared and/or interpreted between a BS and a UE.

Specifically, the number of values of a sub-parameter may mean the number of panels supported by a UE. A "Panel-ID" is present as a sub-parameter within an SRS resource. A value of the "Panel-ID" may also be configured as many as the number of panels of the UE.

That is, two or more values whose orders, such as a first value, a second value, and a third value, have been determined may be present in a sub-parameter(s) having two or more values within an SRS resource.

An order through indexing may be designated in values of a sub-parameter(s) having two or more values.

For example, a first value of a sub-parameter "Panel-ID" may be configured as "P-ID 1", and a second value thereof may be configured as "P-ID 2." In this case, a first value of another sub-parameter(s) may be values for SRS transmission corresponding to P-ID 1. A second value of the another sub-parameter(s) may be values for SRS transmission corresponding to P-ID 2.

For another example, if the aforementioned UL-TCI state (refer to Table 7 is used instead of spatialRelationInfo (i.e., if an UL TCI framework is used), two or more "Panel-IDs" may be designated and two or more SRS transmission beams may also be designated by configuring/indicating multiple specific UL-TCI state indices (e.g., first index, second index, and third index . . . ) in an UL-TCI state field within an SRS resource IE.

A method of defining/configuring/indicating the panel of a UE is specifically illustrated in Table 18 and Table 19.

TABLE 18

```
SRS-Resource : := SEQUENCE {
  srs-ResourceId           SRS-ResourceId,
  panel-Identifier1        Panel-Id
  panel-Identifier2        Panel-Id
```

TABLE 18-continued

```
  nrofSRS-Ports1           ENUMERATED {port1, ports2, ports4},
  nrofSRS-Ports2           ENUMERATED {port1, ports2, ports4},
  ptrs-PortIndex1          ENUMERATED {n0, n1 } OPTIONAL, -- Need R
  ptrs-PortIndex2          ENUMERATED {n0, n1 } OPTIONAL, -- Need R
  resourceMapping          SEQUENCE {
    startPosition          INTEGER (0 . . . 5),
    nrofSymbols            ENUMERATED {n1, n2, n4},
    repetitionFactor       ENUMERATED {n1, n2, n4}
  },
  . . .
}
or,
SRS-Resource : := SEQUENCE {
  srs-ResourceId           SRS-ResourceId,
  nrofSRS-Ports1           ENUMERATED {port1, ports2, ports4},
  nrofSRS-Ports2           ENUMERATED {port1, ports2, ports4},
  ptrs-PortIndex1          ENUMERATED {n0, n1 } OPTIONAL, -- Need R
  ptrs-PortIndex2          ENUMERATED {n0, n1 } OPTIONAL, -- Need R
  resourceMapping          SEQUENCE {
    startPosition          INTEGER (0 . . . 5),
    nrofSymbols            ENUMERATED {n1, n2, n4},
    repetitionFactor       ENUMERATED {n1, n2, n4}
  },
  . . .
  sequenceId1              INTEGER (0 . . . 1023),
  sequenceId2              INTEGER (0 . . . 1023),
  spatialRelationInfo1     SRS-SpatialRelationInfo OPTIONAL, -- Need R
  spatialRelationInfo2     SRS-SpatialRelationInfo OPTIONAL, -- Need R
  . . .
}
SRS-SpatialRelationInfo : := SEQUENCE {
  servingCellId            ServCellIndex OPTIONAL, -- Need S
  panel-Identifier         Panel-Id
  referenceSignal          CHOICE {
  ssb-Index SSB-Index,
  csi-RS-Index NZP-CSI-RS-ResourceId,
  srs                      SEQUENCE {
    resourceId             SRS-ResourceId,
    uplinkBWP              BWP-Id
    }
  }
}
```

TABLE 19

```
SRS-Resource : := SEQUENCE {
  srs-ResourceId           SRS-ResourceId,
  nrofSRS-Ports1           ENUMERATED {port1, ports2, ports4},
  nrofSRS-Ports2           ENUMERATED {port1, ports2, ports4},
  ptrs-PortIndex1          ENUMERATED {n0, n1 } OPTIONAL, -- Need R
  ptrs-PortIndex2          ENUMERATED {n0, n1 } OPTIONAL, -- Need R
  resourceMapping      SEQUENCE {
    startPosition      INTEGER (0 . . . 5),
    nrofSymbols        ENUMERATED {n1, n2, n4},
    repetitionFactor   ENUMERATED {n1, n2, n4}
  },
  . . .
  spatialRelationInfo1 or ul-tciInfo1        UL-TCI-State
  spatialRelationInfo2 or ul-tciInfo2        UL-TCI-State
  . . .
}
UL-TCI-State : := SEQUENCE {
  ul-tci-StateId     UL-TCI-StateId,
  panel-Identifier   Panel-Id,
  [qcl-Type]         [QCL-Info]
  . . .
}
```

Table 18 and Table 19 illustrate RRC configurations when the number of UE panels is 2. Specifically, Table 18 illustrates an SRS configuration based on spatial related information (spatialRelationinfo). Table 19 illustrates an SRS configuration based on an UL-TCI state. The RRC configurations according to Table 18 and Table 19 are merely examples for convenience of description. An implementation of the present embodiment is not limited to the aforementioned examples. For example, the RRC configuration may be extended and applied depending on the number of UE panels.

A specific sub-parameter(s) of an SRS resource having the aforementioned two or more values may include at least one of [comb value], nrofSRS-Ports, ptrs-PortIndex, [sequence generation related parameters] or spatialRelationInf. A sub-parameter having the two or more values may be a parameter (dedicated/uncommon parameter) (second parameter) excluded from the common parameter restrictions according to an embodiment.

For example, a parameter, such as nrofSRS-Ports meaning the number of SRS ports of each panel, may be configured to have two or more values within an SRS resource (i.e., within an SRS resource IE). Accordingly, the number of SRS transmission ports for each panel of a UE is differently configured. A BS may obtain preliminary channel information for optimal layer splitting of an ST×MP PUSCH.

In particular, a parameter, such as spatialRelationInfo, may be configured to have two or more values within an SRS resource. Furthermore, multiple values corresponding to the number of UE panels may be RRC configured in relation to the SRS resource. In this case, a BS may select whether to configure the same value (e.g., a single DL RS for each spatialRelationInfo) or another value (e.g., two different SRS ID (usage="BM") for each spatialRelationInfo) in each of multiple values.

Table 20 illustrates sub-parameters (i.e., dedicated/uncommon parameters) having two or more values.

TABLE 20

| | |
|---|---|
| nrofSRS-Ports | ENUMERATED {port1, ports2, ports4}, |
| ptrs-PortIndex | ENUMERATED {n0, n1 } OPTIONAL, -- Need R |

TABLE 20-continued

| | |
|---|---|
| transmissionComb CHOICE { | |
|   n2 SEQUENCE { | |
|     combOffset-n2 | INTEGER (0 . . . 1), |
|     cyclicShift-n2 | INTEGER (0 . . . 7) |
|   }, | |
|   n4 SEQUENCE { | |
|     combOffset-n4 | INTEGER (0 . . . 3), |
|     cyclicShift-n4 | INTEGER (0 . . . 11) |
|   } | |
| }, | |
| sequenceId | INTEGER (0 . . . 1023), |
| spatialRelationInfo | SRS-SpatialRelationInfo OPTIONAL, -- Need R |

Contrary, a specific sub-parameter(s) within an SRS resource having one value may include at least one of the following parameters.

A frequency domain position, a frequency domain shift, whether frequency hopping is present or not, a hopping pattern, a time domain behavior (e.g., periodic, aperiodic, semi-persistent), a time domain symbol(s)/location and/or a repetition factor (e.g., R)

That is, a specific sub-parameter(s) (first parameter(s)) of an SRS resource having the one value may be configured for a BS to check interference between panels upon UL transmission of a UE before multi-panel simultaneous transmission PUSCH scheduling (ST×MP PUSCH scheduling). A sub-parameter having the one value may be parameters for configuring a simultaneous transmission across multi-panel SRS (ST×MP SRS).

Table 21 illustrates sub-parameters (parameters based on the common restriction) having the one value.

TABLE 21

| | |
|---|---|
| resourceMapping | SEQUENCE { |
|   startPosition | INTEGER (0 . . . 5), |
|   nrofSymbols | ENUMERATED {n1, n2, n4}, |
|   repetitionFactor | ENUMERATED {n1, n2, n4} |
| }, | |
| freqDomainPosition | INTEGER (0 . . . 67), |
| freqDomainShift | INTEGER (0 . . . 268), |
| freqHopping | SEQUENCE { |
|   c-SRS | INTEGER (0 . . . 63), |
|   b-SRS | INTEGER (0 . . . 3), |
|   b-hop | INTEGER (0 . . . 3) |
| }, | |
| groupOrSequenceHopping ENUMERATED { neither, groupHopping, sequenceHopping }, | |
| resourceType CHOICE { | |
|   aperiodic SEQUENCE { | |
|     . . . | |
|   }, | |
|   semi-persistent SEQUENCE { | |
|     periodicityAndOffset-sp SRS-PeriodicityAndOffset, | |
|     . . . | |
|   }, | |
|   periodic SEQUENCE { | |
|     periodicityAndOffset-p SRS-PeriodicityAndOffset, | |
|     . . . | |
|   } | |
| }, | |

Parameters included in an SRS-Resource IE are illustrated in Table 21 below.

TABLE 22

| | |
|---|---|
| SRS-ResourceSetId : := | INTEGER (0 . . . maxNrofSRS-ResourceSets-1) |
| SRS-Resource : := | SEQUENCE { |
|   srs-ResourceId | SRS-ResourceId, |
|   nrofSRS-Ports | ENUMERATED {port1, ports2, ports4}, |
|   ptrs-PortIndex | ENUMERATED {n0, n1 } OPTIONAL, -- Need R |

TABLE 22-continued

```
transmissionComb            CHOICE {
   n2                          SEQUENCE {
      combOffset-n2               INTEGER (0 . . . 1),
      cyclicShift-n2              INTEGER (0 . . . 7)
   },
   n4                          SEQUENCE {
      combOffset-n4               INTEGER (0 . . . 3),
      cyclicShift-n4              INTEGER (0 . . . 11)
   }
},
resourceMapping             SEQUENCE {
   startPosition               INTEGER (0 . . . 5),
   nrofSymbols                 ENUMERATED {n1, n2, n4},
   repetitionFactor            ENUMERATED {n1, n2, n4}
},
freqDomainPosition          INTEGER (0 . . . 67),
freqDomainShift             INTEGER (0 . . . 268),
freqHopping                 SEQUENCE {
   c-SRS                       INTEGER (0 . . . 63),
   b-SRS                       INTEGER (0 . . . 3),
   b-hop                       INTEGER (0 . . . 3)
},
groupOrSequenceHopping         ENUMERATED { neither, groupHopping,
sequenceHopping },
resourceType                CHOICE {
   aperiodic                   SEQUENCE {
      . . .
   },
   semi-persistent             SEQUENCE {
      periodicityAndOffset-sp     SRS-PeriodicityAndOffset,
      . . .
   },
   periodic                    SEQUENCE {
      periodicityAndOffset-p      SRS-PeriodicityAndOffset,
      . . .
   }
},
sequenceId                  INTEGER (0 . . . 1023),
spatialRelationInfo                                 SRS-SpatialRelationInfo
OPTIONAL,   -- Need R
   . . .
}
SRS-SpatialRelationInfo : :=   SEQUENCE {
   servingCellId                                    ServCellIndex
OPTIONAL,   -- Need S
   referenceSignal             CHOICE {
      ssb-Index                   SSB-Index,
      csi-RS-Index                NZP-CSI-RS-ResourceId,
      srs                         SEQUENCE {
         resourceId                  SRS-ResourceId,
         uplinkBWP                   BWP-Id
      }
   }
}
```

A UE may perform the transmission of each SRS resource (i.e., the simultaneous transmission of SRS resources configured for each panel) based on multi-panels through a configuration (RRC configuration) of an SRS based on Proposal 1 (i.e., Methods 1-1, 1-2, 1-3). The UE may perform the transmission of a STxMP SRS periodically/semi-persistently/aperiodically.

Furthermore, a BS may recognize a UL channel situation for the multi-panel of the UE before scheduling layer splitting STxMP PUSCH transmission, and may use the UL channel situation in multi-panel simultaneous transmission PUSCH scheduling (STxMP PUSCH scheduling). The BS may also use the UL channel situation in UL link adaptation across multiple UE Tx panels.

If an operation of transmitting, by a UE, SRS resources based on an STxMP configuration is not present, a BS does not obtain preliminary UL channel information for multi-panel simultaneous transmission PUSCH scheduling (STxMP PUSCH scheduling). In this case, STxMP PUSCH transmission indication may be impossible. As described above, a configuration of a multi-panel simultaneous transmission SRS and the transmission of an SRS based on the corresponding configuration may be essential for the scheduling of the multi-panel simultaneous transmission PUSCH.

A BS may operate as follows based on the configuration (e.g., RRC configuration, etc.) and SRS transmission process described in Proposal 1 (i.e., Methods 1-1, 1-2, 1-3). Specifically, the BS may determine a PUSCH MCS for each panel through UL link adaptation. Furthermore, the BS may use information, obtained based on the aforementioned process, as UL channel information for a transmission precoding matrix indicator (TPMI) and transmission rank indicator (TRI) indication for each panel upon STxMP PUSCH scheduling.

[Proposal 2]
[Proposal 2-1]

A method for a base station to schedule a STxMP PUSCH to a UE is described below. Specifically, there is proposed a method for the base station to indicate a STxMP PUSCH transmission to the UE via lower layer signaling (e.g., UL DCI) based on UL channel information acquired based on SRS related configuration (STxMP SRS configuration) and SRS transmission according to the proposal 1.

The following methods according to the proposal 2-1 may be related to the methods 1-1, 1-2 and 1-3 of the above-described proposal 1. A method 2-1 may be related to the methods 1-1 and 1-2 of the above-described proposal 1, and a method 2-2 may be related to the method 1-3 of the above-described proposal 1.

[Method 2-1]

STxMP PUSCH may be scheduled based on the method 1-1 or the method 1-2.
1) As in the method 1-1 of the proposal 1, if there are configured SRS resources for STxMP transmission within a SRS resource set in which 'usage' is 'multi-panel UL' or STxMP-UL', etc.
2) As in the method 1-2 of the proposal 1, if there are configured SRS resources within a group and/or within a pair in a specific SRS resource set In the case of 1) or 2), a method may be considered in which before the base station schedules the STxMP PUSCH to the UE, the base station connects the corresponding SRS resources to one SRI codepoint of an SRI field included in UL DCI to perform RRC configuration. Through this, the base station may indicate STxMP PUSCH transmission of the UE by indicating the corresponding SRI codepoint when scheduling the STxMP PUSCH via the UL DCI.

That is, in the SRI field of UL DCI, one codepoint may be configured (or mapped) for multiple SRS resources based on UE multi-panel (i.e., configured/assigned for UE multi-panel).

In other words, the operation between the base station and the UE, in which not one SRS resource but two or more SRS resource, that are grouped or paired, are connected to the codepoint of the SRI field, may be considered.

After multiple SRS resources within the group or the pair based on the methods 1-1 and 1-2 are connected to a codepoint of one SRI field by the initial RRC configuration, the connection/link/configuration between the codepoint and the multiple SRS resources in the RRC configuration may be updated/modified/added/released via a medium access control-control element (MAC-CE), etc.

[Method 2-2]

STxMP PUSCH may be scheduled based on the method 1-3.

Configuration for scheduling STxMP PUSCH based on SRS resource(s) configured based on the method 1-3 may be performed. Specifically, before the base station schedules the STxMP PUSCH to the UE, the base station may perform RRC configuration of connecting the SRS resource(s) to a codepoint of an SRI field included in UL DCI. For example, before the base station schedules the STxMP PUSCH to the UE, the base station may transmit, to the UE, configuration information (RRC message) for the connection between the SRS resource(s) and the codepoint of the SRI field. The base station may indicate STxMP PUSCH transmission of the UE by indicating the codepoint of the corresponding SRI field when scheduling the STxMP PUSCH via the UL DCI.

The above-described STxMP PUSCH scheduling operation may be based on the PUSCH scheduling method (SRI indication method) that is the same as the existing method. However, this method is different from the existing method in that SRS resources, to which sub-parameters having two or more values are configured, are connected to the codepoint of the SRI field (method 1-3).

As above, the base station may schedule multi-panel based STxMP PUSCH of the UE by indicating SRS resources including sub-parameters having two or more values using the SRI field of the UL DCI.

After the SRS resource of the method 1-3 is connected to a specific SRI codepoint by the initial RRC configuration, the connection/link/configuration between the codepoint and the SRS resource in the corresponding RRC configuration may be updated/modified/added/released via a medium access control-control element (MAC-CE), etc.

The methods 2-1 and 2-2 have the following effects.

SRS resource(s) (or/and SRS resource set(s)) from different panels (based on the methods 1-1 to 1-3) is(are) connected to a codepoint of a specific SRI field, and thus a PUSCH beam and a PUSCH precoder can be simultaneously indicated. Specifically, if the base station indicates a specific codepoint of an SRI field (via the UL DCI) for the purpose of PUSCH scheduling (in non-codebook based PUSCH transmission), there is an advantage in that a PUSCH (analog) beam indication and a PUSCH precoder from different UE panels can be simultaneously indicated.

Detailed application examples of the proposal 2-1 in relation to the method 1-1 (or the method 1-2) are described below.

Two SRS resources (SRI (1, 2) and SRI (3, 4)) may exist for each of different two panels (panel 1 and panel 2) of the UE, and four SRIs may be connected to a specific codepoint (of an SRI field). If the base station indicates the codepoint via UL DCI transmitted for the STxMP PUSCH scheduling, PUSCH of rank 2 may be scheduled to each of the UE panel 1 and panel 2. A (common) beam of SRI 1 and SRI 2 is utilized as a PUSCH beam of the panel 1, and a (common) beam of SRI 3 and SRI 4 is used as a PUSCH beam of the panel 2.

In addition, a precoder for PUSCH transmission for each panel may be determined as follows. A precoder for PUSCH transmission of the panel 1 may be determined based on a combination of SRS precoder vector(s) that have been used when transmitting the SRI 1 and the SRI 2 (before PUSCH scheduling). A precoder for PUSCH transmission of the panel 2 may be determined based on a combination of SRS precoder vector(s) that have been used when transmitting the SRI 3 and the SRI 4 (before PUSCH scheduling).

In the above example, if the SRI 1, the SRI 3 and the SRI 4 are connected to a different codepoint (of SRI field), the base station/UE may operate as follows. Specifically, if the base station performs the PUSCH scheduling through a codepoint of the corresponding SRI field (if the base station transmits UL DCI indicating the corresponding codepoint), the UE may operate as follows. The UE transmits rank 1 PUSCH using a beam of the SRI 1 and a precoder through the panel 1 and transmits rank 2 PUSCH using a (common) beam of the SRI 3 and the SRI 4 and precoder vector(s) through the panel 2.

Detailed application examples of the proposal 2-1 in relation to the method 1-3 are described below.

If SRS resource(s) including information from different panels of the UE is(are) connected to a specific codepoint (of the SRI field), if the base station indicates the codepoint (via the UL DCI) upon the PUSCH scheduling, transmission beam(s) and precoder vector(s) from each panel that has been previously used upon transmission of the corresponding SRS resource(s) may be used upon PUSCH transmission from each panel of the UE. If the SRS resource of Table 18 is connected to the codepoint, a sub-parameter having two values (a sub-parameter for the panel 1 and the panel 2) is configured to the corresponding SRS resource. Thus, the UE can use the sub-parameter upon PUSCH transmission through the panel 1 and the panel 2.

In the SRI configuration and indication of the proposal 2-1, if the above-described UL-TCI state (see Table 9) is utilized (instead of spatialRelationInfo) (i.e., UL TCI framework is used), an indication for PUSCH (analog) beam may be performed through an UL-TCI state field (e.g., 3-bit field) included in the UL DCI.

If the UL-TCI state field is included in the UL DCI, the PUSCH beam may be indicated by indicating a specific UL-TCI state index in the corresponding field. The specific UL-TCI state index may be an index selected by the base station depending on the SRS transmission based on the method(s) described in the above-mentioned proposal 1. In other words, the specific UL-TCI state index may be an UL-TCI state index that is determined to have the optimum (best) channel state based on UL channel information that the base station acquires through the above-described STxMP SRS transmission.

For example, a plurality of panel IDs may be configured to "Panel-ID" or "P-ID" that is an information element (IE) of the specific UL-TCI state index. Further, a plurality of reference RSs may also be configured to indicate the transmission beam for each panel. Table 23 below represents an example of UL TCI state configuration supporting the simultaneous transmission across multi-panel.

TABLE 23

| Valid UL-TCI state Configuration (UL-TCI state index) | P-ID (panel ID) | Reference RS | (Potential) Target UL channel | [qcl-Type] |
|---|---|---|---|---|
| 1 | 1 | DL RS(a CSI-RS resource or a SSB) | PUSCH | Spatial-relation |
|   | 2 | SRS resource 1 | PUSCH | Spatial-relation |
| 2 | 1 | SSB-RI 1 | PUSCH | Spatial-relation |
|   | 2 | SSB-RI 1 | PUSCH | Spatial-relation |
| 3 | 1 | CRI 1 | PUSCH | Spatial-relation |
|   | 2 | CRI 1 | PUSCH | Spatial-relation |
| 4 | 1 | SRS resource 1 | PUSCH | Spatial-relation |
|   | 2 | SRS resource 2 | PUSCH | Spatial-relation |

Referring to the above Table 23, UL-TCI state configuration indexes 2 and 3 are a case in which a plurality of P-IDs have been configured, but only one reference RS is configured for the transmission beam. If the corresponding reference RS is a downlink reference signal (DL RS), the UE may measure the DL RS with a multi-panel, and a reception beam may present for each panel for the same DL RS. Thus, the UE can perform sumultaneous transmission across UL multi-panel using corresponding transmission beams (with correspondence/reciprocity) to the reception beam for each panel.

As above, the simultaneous transmission across UL multi-panel of the UE can be supported by connecting a single UL-TCI state index to STxMP PUSCH through the UL-TCI state configuration.

Alternatively, in the indication for PUSCH (analog) beam, when the base station schedules STxMP PUSCH of the UE, the simultaneous transmission across UL multi-panel of the UE for the corresponding PUSCH transmission may also be supported by linking/connecting multiple UL-TCI state indexes. The multiple UL-TCI state indexes may be optimum indexes selected by the base station through the UE SRS transmission based on the method(s) described in the above-mentioned proposal 1.

For example, the base station may link/connect/configure the multiple UL-TCI state indexes by RRC-configuring the multiple UL-TCI state indexes to one codepoint in an UL-TCI state filed (e.g., 3-bit field) of UL DCI (see Table 24). Table 24 below represents an example of UL TCI state configuration including the Panel ID.

TABLE 24

| Valid UL-TCI state Configuration (UL-TCI state index) | P-ID (panel ID) | Reference RS | (Potential) Target UL channel | [qcl-Type] |
|---|---|---|---|---|
| 1 | 1 | SRS resource | PUSCH | Spatial-relation |
| 2 | 1 | DL RS(a CSI-RS resource or a SSB) | PUSCH | Spatial-relation |
| 3 | 2 | SRS resource | PUSCH | Spatial-relation |
| 4 | 2 | DL RS(a CSI-RS resource or a SSB) | PUSCH | Spatial-relation |

As illustrated in the above Table 24, after the RRC configuration is performed, the link/connection/configuration between the codepoint and the UL-TCI state in the corresponding RRC configuration may be updated/modified/added/released through MAC CE, etc. If the base station indicates the corresponding codepoint of the UL-TCI state field upon the PUSCH scheduling, the UE may transmit PUSCH using panels(s) and (analog) transmission beam(s) of multiple UL-TCI states connected to the codepoint.

As above, the simultaneous transmission across UL multi-panel of the UE can be supported by connecting the plurality of UL-TCI state indexes to codepoints of the UL-TCI field of UL DCI for STxMP PUSCH scheduling.

A power control procedure in relation to the STxMP PUSCH scheduling according to the above-described embodiments may be performed in advance.

Specifically, in a method of performing a PUSCH beam indication from different panels by connecting the SRS resource(s) described in the proposal 1 (e.g., the methods 1-1 to 1-3) to the SRI field (or UL-TCI state field) described in the proposal 2-1, PUSCH power control from different panels based on a power control procedure (see the power control procedure described above) between the base station and the UE for transmitting the PUSCH may be performed in advance.

For example, a power control parameter (set) corresponding to PUSCH from each panel may be linked/connected to the SRI field or the UL-TCI field of the proposal 2-1 through the RRC configuration/description (in the form of ordered pairs). The base station may perform PUSCH power control configuration/indication for each panel through a specific codepoint indication in the SRI field or the UL-TCI field (of UL DCI) upon the PUSCH scheduling. The power control parameter (set) corresponding to PUSCH from each panel connected to the SRI field or the UL-TCI field may be updated/modified/added/released through the MAC CE, etc. after the initial configuration.

[Proposal 2-2]

A method is proposed to indicate TPMI and TRI of STxMP PUSCH (in codebook based PUSCH transmission) to the UE via UL DCI when the base station schedules the STxMP PUSCH through the SRS configuration of the proposal 1.

The proposal 1 has proposed SRS configuration for each panel in which the number of ports in the UE may be different (the method 1-1, 1-2, and 1-3). The UE may proceed SRS transmission (simultaneous transmission across panels) based on the corresponding configuration, and the base station may obtain channel information of UE multi-panel and then utilize the channel information upon the ST×MP PUSCH scheduling. The base station may acquire UL channel in UE panels consisting of multiple ports and then calculate TPMI and RI for each panel, and shall indicate, to the UE, TPMI and RI for each panel calculated via UL DCI for a ST×MP PUSCH indication.

Up to 6 bits of a TPMI field (e.g., precoding information and number of layers) of UL DCI (e.g., DCI format 0_1) not fallback DCI may exist depending on the RRC configuration. A DCI structure is proposed to vary the number of bits of the TPMI field of UL DCI depending on the number of panels (n panels) of the UE. Specifically, the number of bits (i*n) of the TPMI field may be determined based on the number (i) of bits of the TPMI field for one panel and the number of panels (n panels) of the UE (i.e., the number of bits of the TPMI field=the number of TPMI field bits for one panel*the number of UE panels).

For example, if txConfig (i.e., txConfig=codebook or nonCodeBook) that is a parameter determining an UL MIMO transmission method of the UE is configured as a usage of ST×MP PUSCH such as 'multi-panel UL' or ST×MP-UL', the UE assumes that the number of bits of the TPMI field of UL DCI has a specific value (e.g., i*n bits). The UE in which the txConfig is configured with [txConfig='multi-panel UL' or 'ST×MP-UL', etc.] may operate considering the above assumption upon the blind decoding of UL DCI.

Alternatively, in control resource set (CORESET) configuration between the base station and the UE, a CORESET for ST×MP PUSCH scheduling may be separately present (in this case, the corresponding CORESET may be configured via UE specific RRC signaling (e.g., PDCCH-config)). If PUSCH is scheduled via the corresponding CORESET, the UE expects that the number of bits of the TPMI field of UL DCI has a specific value (e.g., i*n bits).

In particular, a method may be considered in which the base station indicates ST×MP PUSCH transmission using only some UE panel(s) at each specific UL grant time point considering an instantaneous UL channel situation in the TPMI field (i.e., i bit) for each panel of the UE. There may be various methods for supporting the above scheduling, and it should be understood that a specific modification is included in the spirit of the present disclosure.

According to an embodiment, the following method may be considered. When four UE panels are considered (n=4), TPMI fields as many as the total number of bits (i*n bits) as in the above method may be defined/configured. In this instance, it may be configured so that a predefined/preconfigured (default) state (e.g., last (2^i)th state) among 2^i states corresponding to each i-bit represents "panel-off". The UE panel to which a codepoint (state) related to the panel-off is indicated may not be used (activated) (instantaneously) in the corresponding UL transmission. In this case, a panel that is not used in the UL transmission may be maintained in an off-state (deactivation state) until further instructed.

It is included 5-bit field (MCS field) for a modulation and coding scheme (MCS) indication of UL DCI (e.g., DCI format 0_1) not fallback DCI. A DCI structure is proposed to vary the number of bits of the MCS field of UL DCI depending on the number of UE panels (n panels). Specifically, the number of bits of the MCS field may be determined based on the number (n) of UE panels (e.g., 5*n bits).

For example, if txConfig (i.e., txConfig=codebook or nonCodeBook) that is a parameter determining an UL MIMO transmission method of the UE is configured as a usage of ST×MP PUSCH such as 'multi-panel UL' or ST×MP-UL', the UE assumes that the number of bits of the MCS field of UL DCI has a specific value (e.g., 5*n bits). The UE in which the txConfig parameter is configured with [txConfig='multi-panel UL' or 'ST×MP-UL', etc.] may operate considering the above assumption upon the blind decoding of UL DCI.

Alternatively, in control resource set (CORESET) configuration between the base station and the UE, a CORESET for ST×MP PUSCH scheduling may be separately present. If PUSCH is scheduled via the corresponding CORESET, the UE expects that the number of bits of the MCS field of UL DCI has a specific value (e.g., 5*n bits).

Based on the assumption related to the UE-base station operation in the proposal 2-2, the UE and the base station may operate as follows. The base station may indicate a rank, a precoder, and an MCS to be applied to UL transmission for each panel of the UE upon ST×MP (codebook based) PUSCH scheduling. The UE may perform generation and transmission of ST×MP PUSCH according to the corresponding indication.

In terms of implementation, the base station/UE operations (e.g., operations related to the ST×MP PUSCH based on at least one of the proposal 1, the methods 1-1, 1-2 and 1-3, the proposal 2, the proposal 2-1, the methods 2-1 and 2-2, and the proposal 2-2) according to the above-described embodiments may be processed by a device of FIGS. 16 to 20 to be described below (e.g., processors 102 and 202 of FIG. 17).

In addition, the base station/UE operations (e.g., operations related to the ST×MP PUSCH based on at least one of the proposal 1, the methods 1-1, 1-2 and 1-3, the proposal 2, the proposal 2-1, the methods 2-1 and 2-2, and the proposal 2-2) according to the above-described embodiments may be stored in a memory (e.g., 104 and 204 of FIG. 17) in the form of a command/program (e.g., instruction, executable code) for running at least one processor (e.g., 102 and 202 of FIG. 17).

With reference to FIG. 13, a signaling operation between a UE and a base station based on the above-described embodiments is described below.

FIG. 13 illustrates an example of signaling between a UE and a base station to which methods described in the present disclosure are applicable. More specifically, FIG. 13 illustrates an example of signaling between a base station (BS) and a user equipment (UE) for performing simultaneous transmission across panels to which methods (e.g., proposal 1/method 1-1/method 1-2/method 1-3/proposal 2/proposal 2-1/proposal 2-2/method 2-1/method 2-2, etc.) described in the present disclosure are applicable.

In the present disclosure, the UE and the BS are merely an example and may be replaced by various devices to be described below with reference to FIGS. 16 to 20. FIG. 13 is merely for convenience of description and does not limit a range of the present disclosure. With reference to FIG. 13, the UE is assumed to support one or more panels, and simultaneous transmission of UL channel/RS using the one or more panels (i.e., simultaneous transmission across multipanel) can be supported. Further, some step(s) illustrated in FIG. 13 may be omitted depending on substitution and/or setting, etc.

UE Operation

A UE may transmit UE capability information to a base station (BS), in S1310. The UE capability information may include UE capability information related to a panel. For example, the UE capability information may include the number of panels (groups) that the UE can support, information about whether simultaneous transmission across multiple panels can be performed, information about an MPUE category (e.g., see the MPUE category described above), and the like. For example, the UE may transmit, to the BS, the UE capability information related to the proposal methods (e.g., proposal 1/method 1-1/method 1-2/method 1-3/proposal 2/proposal 2-1/proposal 2-2/method 2-1/method 2-2, etc.).

For example, an operation of the UE (100/200 of FIGS. 16 to 20) in the step S1310 to transmit the UE capability information to the BS (100/200 of FIGS. 16 to 20) may be implemented by a device of FIGS. 16 to 20 to be described below. For example, referring to FIG. 17, one or more processors 102 may control one or more transceivers 106 and/or one or more memories 104 so as to transmit the UE capability information, and the one or more transceivers 106 may transmit the UE capability information to the BS.

The UE may receive, from the BS, RRC configuration information related to panel and/or SRS transmission, in S1320. The RRC configuration information may include configuration information related to simultaneous transmission across multi-panel (i.e., STxMP/multi-panel UL), configuration information related to the SRS transmission, configuration information related to the PUSCH transmission, and the like. The RRC configuration information may consist of one or multiple configurations and may be transmitted via UE-specific RRC signaling.

For example, the RRC configuration information may include the RRC configuration, etc. described in the proposal methods (e.g., proposal 1/method 1-1/method 1-2/method 1-3/proposal 2/proposal 2-1/proposal 2-2/method 2-1/method 2-2, etc.). As an example, as described in the method 1-1, the RRC configuration information may include information for usage of an SRS resource set such as multi-panel UL and/or STxMP-UL. As an example, as described in the method 1-2, the RRC configuration information may include grouping/paring information related to STxMP for SRS resources included in the SRS resource set. In this case, as described in the method 2-1, SRS resource(s) included in the RRC configuration information may be connected/linked/mapped/configured to a codepoint of an SRI field included in UL DCI.

As an example, as described in the method 1-3, the RRC configuration information may include information for SRS resource set/SRS resource configuration which is based on an ID (e.g., global ID, common ID), etc. that can be commonly configured to a plurality of panels, and/or is configured/designated as the usage of the STxMP/multi-panel UL. In this case, as described in the method 2-2, SRS resource(s) included in the RRC configuration information may be connected/linked/mapped/configured to a codepoint of the SRI field included in UL DCI.

In the above examples, in order to configure SRS simultaneous transmission across multi-panel, a panel related identifier (e.g., panel-ID) for SRS resource(s) and/or UL-TCI framework (e.g., UL-TCI state) may be used/applied. In the above examples, in relation to parameter(s) for SRS resource, a common parameter restriction and/or a dedicated/uncommon parameter restriction as described above may also be configured.

For example, an operation of the UE (100/200 of FIGS. 16 to 20) in the step S1320 to receive, from the BS (100/200 of FIGS. 16 to 20), the RRC configuration information related to the panel and/or SRS transmission may be implemented by the device of FIGS. 16 to 20 to be described below. For example, referring to FIG. 17, one or more processors 102 may control one or more transceivers 106 and/or one or more memories 104 so as to receive the RRC configuration information related to the panel and/or SRS transmission, and the one or more transceivers 106 may receive, from the BS, the RRC configuration information related to the panel and/or SRS transmission.

The UE may perform the SRS transmission based on the RRC configuration information, in S1330. That is, the UE may transmit an SRS to the BS based on the RRC configuration information. The SRS may be used to perform a channel measurement (e.g., Precoding Matrix Indicator (PMI), Rank Indicator (RI), Channel Quality Indicator (CQI), etc.). The SRS may be a periodic SRS, an aperiodic SRS, and/or a semi-persistent SRS. The semi-persistent SRS may be activated/deactivated via an MAC-CE, etc. and the aperiodic SRS may be triggered via DCI. Further, panel/beam related information (e.g., spatial relation info, parameter SpatialRelationInfo, etc.) for the aperiodic SRS may be configured via the MAC-CE, etc. For example, based on the proposal methods (e.g., proposal 1/method 1-1/method 1-2/method 1-3/proposal 2/proposal 2-1/proposal 2-2/method 2-1/method 2-2, etc.), the UE may perform the SRS transmission based on STxMP/multi-panel UL to the BS. That is, the UE may perform the simultaneous transmission of SRS resources configured for each UE panel. The BS may utilize information acquired through the SRS transmission upon scheduling for each UE panel.

For example, an operation of the UE (100/200 of FIGS. 16 to 20) in the step S1330 to transmit the SRS to the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to transmit the SRS, and the one or more transceivers 106 may transmit the SRS to the BS.

The UE may receive information for updating connection/link/mapping/configuration between the SRS resource(s) included in the RRC configuration information and a codepoint of a specific field (e.g., SRI field) of the UL DCI via the MAC-CE, etc., in S1340. For example, as in the proposal methods (e.g., proposal 1/method 1-1/method 1-2/method 1-3/proposal 2/proposal 2-1/proposal 2-2/method 2-1/method 2-2, etc.), a relation (i.e., connection/link/mapping/configuration) between the specific SRI codepoint and the SRS resource(s) may be updated/modified/added/released via the MAC-CE, etc.

For example, an operation of the UE (100/200 of FIGS. 16 to 20) in the step S1340 to receive the MAC-CE, etc. from the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the MAC-CE, etc., and the one or more transceivers 106 may receive the MAC-CE, etc. from the BS.

The UE may receive a UL DCI for scheduling a PUSCH from the BS, in S1350. For example, as in the proposal methods (e.g., proposal 1/method 1-1/method 1-2/method 1-3/proposal 2/proposal 2-1/proposal 2-2/method 2-1/method 2-2, etc.), the UL DCI may include indication information for a beam/panel for transmitting the PUSCH. For example, the UL DCI may include an UL-TCI state field for a transmission beam of the PUSCH (e.g., see Tables 22 and 23). In this case, an UL-TCI state index may be used to indicate a transmission beam for each panel of the UE. As an example, the UL DCI may include TPMI and/or TRI for STxMP/multi-panel UL transmission of the PUSCH. In this instance, the UL-TCI state index/TPMI/TRI included in the UL DCI may be determined by the BS based on the SRS transmitted in the step S1330. The UL DCI may be transferred via a PDCCH transmitted in CORESET configured for the STxMP/multi-panel UL transmission of the PUSCH. That is, the CORESET for the STxMP/multi-panel UL transmission of the PUSCH may be configured separately between the UE and the BS.

For example, an operation of the UE (100/200 of FIGS. 16 to 20) in the step S1350 to receive the UL DCI from the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the UL DCI, and the one or more transceivers 106 may receive the UL DCI from the BS.

The UE together with the BS may perform a power control procedure for transmitting the PUSCH (e.g., see the uplink power control procedure described above), in S1360. For example, considering the methods described in the proposal methods (e.g., proposal 1/method 1-1/method 1-2/method 1-3, etc.), transmission power for the simultaneously transmitted PUSCH may be determined.

For example, an operation of the UE (100/200 of FIGS. 16 to 20) in the step S1360 to perform the power control procedure together with the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to perform the power control procedure, and the one or more transceivers 106 may transmit and receive information related to the power control procedure together with the BS.

The UE may transmit the PUSCH scheduled by the UL DCI to the BS at the transmission power determined as described above, in S1370. For example, as in the proposal methods (e.g., proposal 1/method 1-1/method 1-2/method 1-3/proposal 2/proposal 2-1/proposal 2-2/method 2-1/method 2-2, etc.), the UE may perform the STxMP/multi-panel UL PUSCH transmission based on the indication information included in the UL DCI. As an example, the UE may transmit the PUSCH in the STxMP/multi-panel UL manner with reference to the SRS resource (i.e., connected/linker/mapped/configured) according to the codepoint of the specific field (e.g., SRI field) included in the UL DCI. For example, the UE may transmit the PUSCH in the STxMP/multi-panel UL manner based on TPMI and/or TRI included in the UL DCI.

For example, an operation of the UE (100/200 of FIGS. 16 to 20) in the step S1370 to transmit the PUSCH to the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to transmit the PUSCH, and the one or more transceivers 106 may transmit the PUSCH to the BS.

BS Operation

ABS may receive UE capability information from a UE, in S1310. The UE capability information may include UE capability information related to a panel. For example, the UE capability information may include the number of panels (groups) that the UE can support, information about whether simultaneous transmission across multiple panels can be performed, information about an MPUE category (e.g., see the MPUE category described above), and the like. For example, the UE may transmit, to the BS, the UE capability information related to the proposal methods (e.g., proposal 1/method 1-1/method 1-2/method 1-3/proposal 2/proposal 2-1/proposal 2-2/method 2-1/method 2-2, etc.).

For example, an operation of the BS (100/200 of FIGS. 16 to 20) in the step S1310 to receive the UE capability information from the UE (100/200 of FIGS. 16 to 20) may be implemented by a device of FIGS. 16 to 20 to be described below. For example, referring to FIG. 17, one or more processors 102 may control one or more transceivers 106 and/or one or more memories 104 so as to receive the UE capability information, and the one or more transceivers 106 may receive the UE capability information from the UE.

The BS may transmit, to the UE, RRC configuration information related to panel and/or SRS transmission, in S1320. The RRC configuration information may include configuration information related to simultaneous transmission across multi-panel (i.e., STxMP/multi-panel UL), configuration information related to the SRS transmission, configuration information related to the PUSCH transmission, and the like. The RRC configuration information may consist of one or multiple configurations and may be transmitted via UE-specific RRC signaling.

For example, the RRC configuration information may include the RRC configuration, etc. described in the proposal methods (e.g., proposal 1/method 1-1/method 1-2/method 1-3/proposal 2/proposal 2-1/proposal 2-2/method 2-1/method 2-2, etc.). As an example, as described in the method 1-1, the RRC configuration information may include information for usage of an SRS resource set such as multi-panel UL and/or STxMP-UL. As an example, as described in the method 1-2, the RRC configuration information may include grouping/paring information related to STxMP for SRS resources included in the SRS resource set. In this case, as described in the method 2-1, SRS resource(s) included in the RRC configuration information may be connected/linked/mapped/configured to a codepoint of an SRI field included in UL DCI.

As an example, as described in the method 1-3, the RRC configuration information may include information for SRS resource set/SRS resource configuration which is based on an ID (e.g., global ID, common ID), etc. that can be commonly configured to a plurality of panels, and/or is configured/designated as the usage of the STxMP/multi-panel UL. In this case, as described in the method 2-2, SRS resource(s) included in the RRC configuration information may be connected/linked/mapped/configured to a codepoint of the SRI field included in UL DCI.

In the above examples, in order to configure SRS simultaneous transmission across multi-panel, a panel related identifier (e.g., panel-ID) for SRS resource(s) and/or UL-TCI framework (e.g., UL-TCI state) may be used/applied. In the above examples, in relation to parameter(s) for SRS resource, a common parameter restriction and/or a dedicated/uncommon parameter restriction as described above may also be configured.

For example, an operation of the BS (100/200 of FIGS. 16 to 20) in the step S1320 to transmit, to the UE (100/200 of FIGS. 16 to 20), the RRC configuration information related to the panel and/or SRS transmission may be implemented by the device of FIGS. 16 to 20 to be described below. For example, referring to FIG. 17, one or more processors 102 may control one or more transceivers 106 and/or one or more memories 104 so as to transmit the RRC configuration information related to the panel and/or SRS transmission, and the one or more transceivers 106 may transmit, to the UE, the RRC configuration information related to the panel and/or SRS transmission.

The BS may receive the SRS transmitted based on the RRC configuration information, in S1330. That is, the UE may transmit an SRS to the BS based on the RRC configuration information. The SRS may be used to perform a channel measurement (e.g., precoding matrix indicator (PMI), rank indicator (RI), channel quality indicator (CQI), etc.). The SRS may be a periodic SRS, an aperiodic SRS, and/or a semi-persistent SRS. The semi-persistent SRS may be activated/deactivated via an MAC-CE, etc. and the aperiodic SRS may be triggered via DCI. Further, panel/beam related information (e.g., spatial relation info, parameter SpatialRelationInfo, etc.) for the aperiodic SRS may be configured via the MAC-CE, etc. For example, based on the proposal methods (e.g., proposal 1/method 1-1/method 1-2/method 1-3/proposal 2/proposal 2-1/proposal 2-2/method 2-1/method 2-2, etc.), the UE may perform the SRS transmission based on ST×MP/multi-panel UL to the BS. That is, the UE may perform the simultaneous transmission of SRS resources configured for each UE panel. The BS may utilize information acquired through the SRS transmission upon scheduling for each UE panel.

For example, an operation of the BS (100/200 of FIGS. 16 to 20) in the step S1330 to receive the SRS from the UE (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the SRS, and the one or more transceivers 106 may receive the SRS from the UE.

The BS may transmit information for updating connection/link/mapping/configuration between the SRS resource(s) included in the RRC configuration information and a codepoint of a specific field (e.g., SRI field) of the UL DCI via the MAC-CE, etc., in S1340. For example, as in the proposal methods (e.g., proposal 1/method 1-1/method 1-2/method 1-3/proposal 2/proposal 2-1/proposal 2-2/method 2-1/method 2-2, etc.), a relation (i.e., connection/link/mapping/configuration) between the specific SRI codepoint and the SRS resource(s) may be updated/modified/added/released via the MAC-CE, etc.

For example, an operation of the BS (100/200 of FIGS. 16 to 20) in the step S1340 to transmit the MAC-CE, etc. to the UE (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to transmit the MAC-CE, etc., and the one or more transceivers 106 may transmit the MAC-CE, etc. to the UE.

The BS may transmit a UL DCI for scheduling a PUSCH to the UE, in S1350. For example, as in the proposal methods (e.g., proposal 1/method 1-1/method 1-2/method 1-3/proposal 2/proposal 2-1/proposal 2-2/method 2-1/method 2-2, etc.), the UL DCI may include indication information for a beam/panel for transmitting the PUSCH. For example, the UL DCI may include an UL-TCI state field for a transmission beam of the PUSCH (e.g., see Tables 22 and 23). In this case, an UL-TCI state index may be used to indicate a transmission beam for each panel of the UE. As an example, the UL DCI may include TPMI and/or TRI for ST×MP/multi-panel UL transmission of the PUSCH. In this instance, the UL-TCI state index/TPMI/TRI included in the UL DCI may be determined by the BS based on the SRS transmitted in the step S1330. The UL DCI may be transferred via a PDCCH transmitted in CORESET configured for the ST×MP/multi-panel UL transmission of the PUSCH. That is, the CORESET for the ST×MP/multi-panel UL transmission of the PUSCH may be configured separately between the UE and the BS.

For example, an operation of the BS (100/200 of FIGS. 16 to 20) in the step S1350 to transmit the UL DCI to the UE (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to transmit the UL DCI, and the one or more transceivers 106 may transmit the UL DCI to the UE.

The BS together with the UE may perform a power control procedure for transmitting the PUSCH of the UE (e.g., see the uplink power control procedure described above), in S1360. For example, considering the methods described in the proposal methods (e.g., proposal 1/method 1-1/method 1-2/method 1-3, etc.), transmission power for the simultaneously transmitted PUSCH may be determined.

For example, an operation of the BS (100/200 of FIGS. 16 to 20) in the step S1360 to perform the power control procedure together with the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to perform the power control procedure, and the one or more transceivers 106 may transmit and receive information related to the power control procedure together with the UE.

The BS may receive, from the UE, the PUSCH that is transmitted at the transmission power determined as described above and is scheduled by the UL DCI, in S1370. For example, as in the proposal methods (e.g., proposal 1/method 1-1/method 1-2/method 1-3/proposal 2/proposal 2-1/proposal 2-2/method 2-1/method 2-2, etc.), the UE may perform the ST×MP/multi-panel UL PUSCH transmission based on the indication information included in the UL DCI. As an example, the UE may transmit the PUSCH in the ST×MP/multi-panel UL manner with reference to the SRS resource (i.e., connected/linker/mapped/configured) according to the codepoint of the specific field (e.g., SRI field) included in the UL DCI. For example, the BS may receive the PUSCH in the ST×MP/multi-panel UL manner based on TPMI and/or TRI included in the UL DCI.

For example, an operation of the BS (100/200 of FIGS. 16 to 20) in the step S1370 to receive the PUSCH from the UE (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the PUSCH, and the one or more transceivers 106 may receive the PUSCH from the UE.

As mentioned above, the BS/UE signaling and operation (e.g., proposal 1/method 1-1/method 1-2/method 1-3/proposal 2/proposal 2-1/proposal 2-2/method 2-1/method 2-2/FIG. 13, etc.) described above may be implemented by a device to be described below (e.g., FIGS. 16 to 20). For example, the UE may correspond to a first wireless device, and the BS may correspond to a second wireless device. In some cases, the reverse may also be considered.

For example, the BS/UE signaling and operation (e.g., proposal 1/method 1-1/method 1-2/method 1-3/proposal 2/proposal 2-1/proposal 2-2/method 2-1/method 2-2/FIG. 13, etc.) described above may be processed by one or more processors (e.g., 102 and 202) of FIGS. 16 to 20. The BS/UE signaling and operation (e.g., proposal 1/method 1-1/method 1-2/method 1-3/proposal 2/proposal 2-1/proposal 2-2/ method 2-1/method 2-2/FIG. 13, etc.) described above may be stored in a memory (e.g., one or more memories 104 and 204 of FIG. 17) in the form of a command/program (e.g., instruction, executable code) for running at least one processor (e.g., 102 and 202) of FIGS. 16 to 20.

Methods for performing the PUSCH transmission according to the proposal methods (e.g., proposal 1/method 1-1/ method 1-2/method 1-3/proposal 2/proposal 2-1/proposal 2-2/method 2-1/method 2-2/FIG. 13, etc.) may be the same as the following examples.

[First Method]

Example 1-1

For example, in a method of performing, by a UE, transmission of a PUSCH in a wireless communication system, the method may comprise:

- receiving, from a base station, configuration information related to the transmission of the PUSCH;
- receiving, from the base station, downlink control information (DCI) for scheduling the PUSCH;
- performing a power control procedure for the transmission of the PUSCH together with the base station; and
- transmitting, to the base station, the PUSCH across multiple panels of the UE based on the DCI and a transmission power calculated by the power control procedure.

The configuration information may include configuration information related to the PUSCH transmission based on the multiple panels.

The PUSCH may be transmitted across the multiple panels in the same time domain (i.e., simultaneous transmission).

The configuration information may include one or more SRS resource sets, and each of the one or more SRS resource sets may include at least one SRS resource.

In this case, the proposal methods (e.g., proposal 1/method 1-1/method 1-2/method 1-3/proposal 2/proposal 2-1/proposal 2-2/method 2-1/method 2-2/FIG. 13, etc.) may be applied.

Example 1-2

In the Example 1-1, the configuration information may include information indicating a usage for the one or more SRS resource sets, and the usage may be configured as an SRS transmission based on the multiple panels.

Example 1-3

In the Example 1-1/1-2, the configuration information may include information for a group and/or a pair for the simultaneous transmission configured for the at least one SRS resource.

Example 1-4

In the Example 1-1/1-2/1-3, the configuration information may include information for an identifier of SRS resource(s) (e.g., global ID, common ID) that can be commonly configured to the multiple panels.

Example 1-5

In the Example 1-4, the SRS resource(s) may be SRS resource(s) specified for a plurality of uplink/SRS transmissions based on the multiple panels.

Example 1-6

In the Example 1-4/1-5, parameters configured to one SRS resource may be configured per the multiple panels.

Example 1-7

In the Example 1-1/1-2/1-3/1-4/1-5/1-6, information state(s) of a specific field of the DCI may be configured to have a relationship with the at least one SRS resource.

Example 1-8

In the Example 1-1/1-2/1-3/1-4/1-5/1-6/1-7, the information state(s) of the specific field of the DCI may be mapped to the at least one SRS resource.

Example 1-9

In the Example 1-1/1-2/1-3/1-4/1-5/1-6/1-7/1-8, the configuration information may be transmitted via (UE-specific) higher layer signaling (e.g., RRC signaling, etc.).

Example 1-10

In the Example 1-1/1-2/1-3/1-4/1-5/1-6/1-7/1-8/1-9, the DCI may include indication information for a transmission beam and/or a panel of the PUSCH.

Example 1-11

In the Example 1-10, the indication information may be an index for an UL TCI state associated with a transmission beam and/or a panel of the UE Example 1-12

In the Example 1-10, the indication information may be may be an index for an UL TCI state associated with the at least one SRS resource.

Example 1-13

In the Example 1-10/1-11/1-12, the DCI may include TPMI and/or TRI for the transmission of the PUSCH.

Example 1-14

In the Example 1-1/1-2/1-3/1-4/1-5/1-6/1-7/1-8/1-9/1-10/ 1-11/1-12/1-13, the UE may transmit an SRS to the base station based on the configuration information.

Example 1-15

In the Example 1-14, the SRS may be used to determine the indication information for the transmission beam and/or the panel of the PUSCH, the TPMI, and the TRI.

Example 1-16

In the Example 1-14/1-15, the one or more SRS resource sets and/or the at least one SRS resource related to the transmission of the SRS may be configured and/or indicated based on a panel related identifier (e.g., panel-ID) and/or an UL-TCI state.

Example 1-17

In the Example 1-1/1-2/1-3/1-4/1-5/1-6/1-7/1-8/1-9/1-10/1-11/1-12/1-13/1-14/1-15/1-16, the UE may receive, from the base station, information for updating a relationship between the information state(s) of the specific field of the DCI and the at least one SRS resource.

Example 1-18

In the Example 1-17, the information may be received via an MAC-CE, etc.

Example 1-19

In the Example 1-1/1-2/1-3/1-4/1-5/1-6/1-7/1-8/1-9/1-10/1-11/1-12/1-13/1-14/1-15/1-16/1-17/1-18, the UE may transmit, to the base station, UE capability information related to the SRS transmission based on the multiple panels. The UE capability information may include information for whether to support the SRS transmission based on the multiple panels, the number of panels supported by the UE, etc.

[Second Method]

Example 2-1

For example, in a method of performing, by a base station, reception of a PUSCH in a wireless communication system, the method may comprise:
  transmitting, to a UE, configuration information related to transmission of the PUSCH;
  transmitting, to the UE, downlink control information (DCI) for scheduling the PUSCH;
  performing a power control procedure for the transmission of the PUSCH together with the UE; and
  receiving, from the UE, the PUSCH transmitted across multiple panels of the UE at a transmission power calculated by the power control procedure based on the DCI.

The configuration information may include configuration information related to the PUSCH transmission based on the multiple panels.

The PUSCH may be transmitted across the multiple panels in the same time domain (i.e., simultaneous transmission).

The configuration information may include one or more SRS resource sets, and each of the one or more SRS resource sets may include at least one SRS resource.

In this case, the proposal methods (e.g., proposal 1/method 1-1/method 1-2/method 1-3/proposal 2/proposal 2-1/proposal 2-2/method 2-1/method 2-2/FIG. 13, etc.) may be applied.

[First Device]

Example 3-1

For example, in a UE performing transmission of a PUSCH in a wireless communication system, the UE may comprise:
  a radio frequency (RF) unit, at least one processor, and at least one memory operatively connected to the at least one processor.

The memory may store instructions that allow the at least one processor to perform operations of i) receiving, from a base station, configuration information related to the transmission of the PUSCH through the RF unit, ii) receiving, from the base station, downlink control information (DCI) for scheduling the PUSCH through the RF unit, iii) performing a power control procedure for the transmission of the PUSCH together with the base station, and iv) transmitting, to the base station, the PUSCH across multiple panels of the UE based on the DCI and a transmission power calculated by the power control procedure through the RF unit.

The configuration information may include configuration information related to the PUSCH transmission based on the multiple panels.

The PUSCH may be transmitted across the multiple panels in the same time domain (i.e., simultaneous transmission).

The configuration information may include one or more SRS resource sets, and each of the one or more SRS resource sets may include at least one SRS resource.

In this case, the proposal methods (e.g., proposal 1/method 1-1/method 1-2/method 1-3/proposal 2/proposal 2-1/proposal 2-2/method 2-1/method 2-2/FIG. 13, etc.) may be applied.

[Second Device]

Example 4-1

For example, in a base station performing reception of a PUSCH in a wireless communication system, the base station may comprise:
  a radio frequency (RF) unit, at least one processor, and at least one memory operatively connected to the at least one processor.

The memory may store instructions that allow the at least one processor to perform operations of i) transmitting, to a UE, configuration information related to transmission of the PUSCH through the RF unit, ii) transmitting, to the UE, downlink control information (DCI) for scheduling the PUSCH through the RF unit, iii) performing a power control procedure for the transmission of the PUSCH together with the UE, and iv) receiving, from the UE, the PUSCH transmitted across multiple panels of the UE at a transmission power calculated by the power control procedure based on the DCI through the RF unit.

The configuration information may include configuration information related to the PUSCH transmission based on the multiple panels.

The PUSCH may be transmitted across the multiple panels in the same time domain (i.e., simultaneous transmission).

The configuration information may include one or more SRS resource sets, and each of the one or more SRS resource sets may include at least one SRS resource.

In this case, the proposal methods (e.g., proposal 1/method 1-1/method 1-2/method 1-3/proposal 2/proposal 2-1/proposal 2-2/method 2-1/method 2-2/FIG. 13, etc.) may be applied.

The embodiments described above are described from a UE perspective in detail below with reference to FIG. 14. Methods to be described below are distinguished merely for convenience of description. Therefore, it is obvious that partial configuration of any one method can be replaced by partial configuration of other method, or methods can be combined and applied.

FIG. 14 is a flow chart illustrating a method of transmitting, by a UE, a physical uplink shared channel in a wireless communication system according to an embodiment of the present disclosure.

Referring to FIG. 14, a method of transmitting, by a UE, a physical uplink shared channel (PUSCH) in a wireless communication system according to an embodiment of the present disclosure comprises receiving configuration information related to transmission of the PUSCH in S1410, receiving downlink control information (DCI) scheduling the PUSCH in S1420, and transmitting the PUSCH in S1430.

In the S1410, the UE receives, from a base station, the configuration information related to the PUSCH.

According to the S1410, an operation of the UE (100/200 of FIGS. 16 to 20) to receive, from the base station (100/200 of FIGS. 16 to 20), the configuration information related to the PUSCH may be implemented by a device of FIGS. 16 to 20. For example, referring to FIG. 17, one or more processors 102 may control one or more transceivers 106 and/or one or more memories 104 so as to receive, from the base station 200, the configuration information related to the PUSCH.

In the S1420, the UE receives the DCI scheduling the PUSCH from the base station.

According to an embodiment, the DCI includes a specific field. The specific field may be based on uplink (UL) transmission configuration indicator (TCI) field or an SRI field.

According to an embodiment, the SRI field may represent at least one specific SRS resource. The specific SRS resource may be based on i) a first parameter related to a plurality of panels, and ii) a second parameter related to one panel of the plurality of panels. This embodiment may be based on the proposal 2-1 (methods 2-1 and 2-2).

The first parameter may be a parameter based on a common parameter restriction, and the second parameter may be a parameter excluded from the common parameter restriction.

Based on that the SRI field represents a plurality of specific SRS resources, a usage of the specific SRS resources may be related to a simultaneous transmission across multi-panel (STxMP). This embodiment may be based on the method 2-1 (and the method 1-1).

Based on that the SRI field represents the plurality of specific SRS resources, the specific SRS resources may be based on at least one SRS resource belonging to an SRS resource group related to the STxMP. This embodiment may be based on the method 2-1 (and the method 1-2).

Based on that the SRI field represents one specific SRS resource, the specific SRS resource may be configured with at least one parameter having a plurality of values. In this instance, the second parameter may be a parameter having the plurality of values, and the first parameter may be a parameter having one value. This embodiment may be based on the method 2-2 (and the method 1-3).

According to an embodiment, the configuration information may include information for a mapping between a codepoint of the specific field and the at least one SRS resource related to the STxMP.

According to an embodiment, based on that the PUSCH is a codebook based PUSCH, a number of bits of at least one field included in the DCI may be determined based on a number of the plurality of panels. This embodiment may be based on the proposal 2-2.

The at least one field may include at least one of a TPMI field or an MCS field.

Based on that the TPMI field represents a preconfigured state, a panel related to the preconfigured state among the plurality of panels may be off. That is, a panel related to the preconfigured state among the plurality of panels may not be used (activated) upon the PUSCH transmission.

According to the S1420, an operation of the UE (100/200 of FIGS. 16 to 20) to receive, from the base station (100/200 of FIGS. 16 to 20), the DCI scheduling the PUSCH may be implemented by the device of FIGS. 16 to 20. For example, referring to FIG. 17, one or more processors 102 may control one or more transceivers 106 and/or one or more memories 104 so as to receive, from the base station 200, the DCI scheduling the PUSCH.

In the S1430, the UE transmits the PUSCH to the base station based on the DCI. The PUSCH may be STxMP PUSCH.

According to an embodiment, based on that the specific field represents at least one SRS resource related to the STxMP, the PUSCH may be transmitted based on a plurality of panels. This embodiment may be based on the proposal 2.

According to an embodiment, a transmission power of the PUSCH related to at least one of the plurality of panels may be determined based on the specific field. That is, a power control for each panel may be performed based on the specific field. The PUSCH may be transmitted based on the determined transmission power.

According to the S1430, an operation of the UE (100/200 of FIGS. 16 to 20) to transmit the PUSCH to the base station (100/200 of FIGS. 16 to 20) based on the DCI may be implemented by the device of FIGS. 16 to 20. For example, referring to FIG. 17, one or more processors 102 may control one or more transceivers 106 and/or one or more memories 104 so as to transmit the PUSCH to the base station 200 based on the DCI.

The PUSCH may be scheduled based on an uplink channel measurement, and thus the method may further comprise a step of receiving SRS configuration information and a step of transmitting an SRS. This embodiment may be based on the method 1-1, 1-2 or 1-3 of the proposal 1.

In the step of receiving the SRS configuration information, the UE receives, from the base station, configuration information for a sounding reference signal (SRS) related to the STxMP.

According to the step of receiving the SRS configuration information, an operation of the UE (100/200 of FIGS. 16 to 20) to receive, from the base station (100/200 of FIGS. 16 to 20), the configuration information for the sounding reference signal (SRS) related to the STxMP may be implemented by the device of FIGS. 16 to 20. For example, referring to FIG. 17, one or more processors 102 may control one or more transceivers 106 and/or one or more memories 104 so as to receive, from the base station 200, the configuration information for the SRS related to the STxMP.

In the step of transmitting the SRS, the UE transmits the SRS to the base station based on the configuration information for the SRS.

According to an embodiment, the specific field (e.g., SRI field) may be determined based on the SRS. Hence, the transmission of the STxMP PUSCH may be scheduled based on interference measurement information between the panels and UL channel information.

According to the step of transmitting the SRS, an operation of the UE (100/200 of FIGS. 16 to 20) to transmit the SRS to the base station (100/200 of FIGS. 16 to 20) based on the configuration information for the SRS may be implemented by the device of FIGS. 16 to 20. For example, referring to FIG. 17, one or more processors 102 may control one or more transceivers 106 and/or one or more memories 104 so as to transmit the SRS to the base station 200 based on the configuration information for the SRS.

The embodiments described above are described from a perspective of an operation of a base station in detail below with reference to FIG. 15. Methods to be described below are distinguished merely for convenience of description. Therefore, it is obvious that partial configuration of any one method can be replaced by partial configuration of other method, or methods can be combined and applied.

FIG. 15 is a flow chart illustrating a method of receiving, by a base station, a physical uplink shared channel in a wireless communication system according to another embodiment of the present disclosure.

Referring to FIG. 15, a method of receiving, by a base station, a physical uplink shared channel (PUSCH) in a wireless communication system according to an embodiment of the present disclosure comprises transmitting configuration information related to transmission of the PUSCH in S1510, transmitting downlink control information (DCI) scheduling the PUSCH in S1520, and receiving the PUSCH in S1530.

In the S1510, the base station transmits, to a UE, the configuration information related to the PUSCH.

According to the S1510, an operation of the base station (100/200 of FIGS. 16 to 20) to transmit, to the UE (100/200 of FIGS. 16 to 20), the configuration information related to the PUSCH may be implemented by a device of FIGS. 16 to 20. For example, referring to FIG. 17, one or more processors 102 may control one or more transceivers 106 and/or one or more memories 104 so as to transmit, to the UE 100, the configuration information related to the PUSCH.

In the S1520, the base station transmits the DCI scheduling the PUSCH to the UE.

According to an embodiment, the DCI includes a specific field. The specific field may be based on uplink (UL) transmission configuration indicator (TCI) field or an SRI field.

According to an embodiment, the SRI field may represent at least one specific SRS resource. The specific SRS resource may be based on i) a first parameter related to a plurality of panels, and ii) a second parameter related to one panel of the plurality of panels. This embodiment may be based on the proposal 2-1 (methods 2-1 and 2-2).

The first parameter may be a parameter based on a common parameter restriction, and the second parameter may be a parameter excluded from the common parameter restriction.

Based on that the SRI field represents a plurality of specific SRS resources, a usage of the specific SRS resources may be related to a simultaneous transmission across multi-panel (STxMP). This embodiment may be based on the method 2-1 (and the method 1-1).

Based on that the SRI field represents the plurality of specific SRS resources, the specific SRS resources may be based on at least one SRS resource belonging to an SRS resource group related to the STxMP. This embodiment may be based on the method 2-1 (and the method 1-2).

Based on that the SRI field represents one specific SRS resource, the specific SRS resource may be configured with at least one parameter having a plurality of values. In this instance, the second parameter may be a parameter having the plurality of values, and the first parameter may be a parameter having one value. This embodiment may be based on the method 2-2 (and the method 1-3).

According to an embodiment, the configuration information may include information for a mapping between a codepoint of the specific field and the at least one SRS resource related to the STxMP.

According to an embodiment, based on that the PUSCH is a codebook based PUSCH, a number of bits of at least one field included in the DCI may be determined based on a number of the plurality of panels. This embodiment may be based on the proposal 2-2.

The at least one field may include at least one of a TPMI field or an MCS field.

Based on that the TPMI field represents a preconfigured state, a panel related to the preconfigured state among the plurality of panels may be off. That is, a panel related to the preconfigured state among the plurality of panels may not be used (activated) upon the PUSCH transmission.

According to the S1520, an operation of the base station (100/200 of FIGS. 16 to 20) to transmit, to the UE (100/200 of FIGS. 16 to 20), the DCI scheduling the PUSCH may be implemented by the device of FIGS. 16 to 20. For example, referring to FIG. 17, one or more processors 102 may control one or more transceivers 106 and/or one or more memories 104 so as to transmit, to the UE 100, the DCI scheduling the PUSCH.

In the S1530, the base station receives the PUSCH from the UE based on the DCI. The PUSCH may be STxMP PUSCH.

According to an embodiment, based on that the specific field represents at least one SRS resource related to the STxMP, the PUSCH may be transmitted based on a plurality of panels. This embodiment may be based on the proposal 2.

According to an embodiment, a transmission power of the PUSCH related to at least one of the plurality of panels may be determined based on the specific field. That is, a power control for each panel may be performed based on the specific field. The PUSCH may be transmitted based on the determined transmission power.

According to the S1530, an operation of the base station (100/200 of FIGS. 16 to 20) to receive the PUSCH from the UE (100/200 of FIGS. 16 to 20) based on the DCI may be implemented by the device of FIGS. 16 to 20. For example, referring to FIG. 17, one or more processors 102 may control one or more transceivers 106 and/or one or more memories 104 so as to receive the PUSCH from the UE 200 based on the DCI.

The PUSCH may be scheduled based on an uplink channel measurement, and thus the method may further comprise a step of transmitting SRS configuration information and a step of receiving an SRS. This embodiment may be based on the method 1-1, 1-2 or 1-3 of the proposal 1.

In the step of transmitting the SRS configuration information, the base station transmits, to the UE, configuration information for a sounding reference signal (SRS) related to the STxMP.

According to the step of transmitting the SRS configuration information, an operation of the base station (100/200 of FIGS. 16 to 20) to transmit, to the UE (100/200 of FIGS. 16 to 20), the configuration information for the sounding reference signal (SRS) related to the STxMP may be implemented by the device of FIGS. 16 to 20. For example, referring to FIG. 17, one or more processors 102 may control one or more transceivers 106 and/or one or more memories 104 so as to transmit, to the UE 100, the configuration information for the SRS related to the STxMP.

In the step of receiving the SRS, the base station receives the SRS from the UE based on the configuration information for the SRS.

According to an embodiment, the specific field (e.g., SRI field) may be determined based on the SRS. Hence, the transmission of the ST×MP PUSCH may be scheduled based on interference measurement information between the panels and UL channel information.

According to the step of receiving the SRS, an operation of the base station (100/200 of FIGS. 16 to 20) to receive the SRS from the UE (100/200 of FIGS. 16 to 20) based on the configuration information for the SRS may be implemented by the device of FIGS. 16 to 20. For example, referring to FIG. 17, one or more processors 102 may control one or more transceivers 106 and/or one or more memories 104 so as to receive the SRS from the UE 100 based on the configuration information for the SRS.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 19 illustrates another example of a wireless device applied to the present disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 20 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method of transmitting and receiving a physical uplink shared channel and a device thereof in a wireless communication system according to an embodiment of the present disclosure are described as follows.

According to an embodiment of the present disclosure, based on that a specific field of downlink control information (DCI) scheduling a PUSCH represents at least one SRS resource related to a simultaneous transmission across multi-panel (STxMP), the PUSCH is transmitted based on a plurality of panels. Information (e.g., beam, precoder, panel ID, etc.) for each of the plurality of panels can be simultaneously indicated by the specific field, and thus a signaling overhead for scheduling of STxMP PUSCH transmission can be reduced.

According to an embodiment of the present disclosure, the specific field can be based on an SRI field, and the SRI field can represent at least one specific SRS resource. The specific SRS resource can be based on i) a first parameter related to the plurality of panels, and ii) a second parameter related to one panel of the plurality of panels. Thus, at least one specific SRS resource is indicated based on the first parameter that is common to the plurality of panels through the SRI field and the second parameter configured for each panel, and thus transmission of STxMP PUSCH can be scheduled based on interference measurement information between the panels and UL channel information.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of transmitting, by a user equipment (UE), a physical uplink shared channel (PUSCH) in a wireless communication system, the method comprising:
   receiving configuration information related to the PUSCH;
   receiving downlink control information (DCI) scheduling the PUSCH; and
   transmitting the PUSCH based on the DCI,
   wherein the DCI includes a specific field,
   wherein based on that the specific field represents at least one sounding reference signal (SRS) resource related to a simultaneous transmission across multi-panel (STxMP), the PUSCH is transmitted based on a plurality of panels, and
   wherein the specific field is based on an SRS resource indicator (SRI) field representing at least one specific SRS resource which is configured based on i) a first parameter related to the plurality of panels, and ii) a second parameter related to one panel of the plurality of panels.

2. The method of claim 1, wherein based on that the SRI field represents a plurality of specific SRS resources, a usage of the specific SRS resources is related to the STxMP.

3. The method of claim 1, wherein based on that the SRI field represents a plurality of specific SRS resources, the specific SRS resources are based on at least one SRS resource belonging to an SRS resource group related to the STxMP.

4. The method of claim 1, wherein based on that the SRI field represents one specific SRS resource, the specific SRS resource is configured with at least one parameter having a plurality of values,
   wherein the second parameter is a parameter having the plurality of values, and
   wherein the first parameter is a parameter having one value.

5. The method of claim 1, wherein a transmission power of the PUSCH related to at least one of the plurality of panels is determined based on the specific field.

6. The method of claim 1, further comprising:
   receiving configuration information for a SRS related to the STxMP; and
   transmitting the SRS based on the configuration information for the SRS,
   wherein the specific field is determined based on the SRS.

7. The method of claim 1, wherein based on that the PUSCH is a codebook based PUSCH, a number of bits of at least one field included in the DCI is determined based on a number of the plurality of panels.

8. The method of claim 7, wherein the at least one field includes at least one of a Transmit Precoding Matrix Indicator (TPMI) field or a Modulation and coding scheme (MCS) field.

9. The method of claim 8, wherein based on that the TPMI field represents a preconfigured state, a panel related to the preconfigured state among the plurality of panels is off.

10. The method of claim 1, wherein the configuration information includes information for a mapping between a codepoint of the specific field and the at least one SRS resource related to the STxMP.

11. A user equipment (UE) transmitting a physical uplink shared channel (PUSCH) in a wireless communication system, the UE comprising:
    one or more transceivers;
    one or more processors configured to control the one or more transceivers; and
    one or more memories operatively connected to the one or more processors and storing instructions that, based on being executed by the one or more processors, performing operations,
    wherein the operations comprise:
    receiving configuration information related to the PUSCH;
    receiving downlink control information (DCI) scheduling the PUSCH; and
    transmitting the PUSCH based on the DCI,
    wherein the DCI includes a specific field,
    wherein based on that the specific field represents at least one sounding reference signal (SRS) resource related to a simultaneous transmission across multi-panel (STxMP), the PUSCH is transmitted based on a plurality of panels, and
    wherein the specific field is based on an SRS resource indicator (SRI) field representing at least one specific SRS resource which is configured based on i) a first parameter related to the plurality of panels, and ii) a second parameter related to one panel of the plurality of panels.

12. A method of receiving, by a base station, a physical uplink shared channel (PUSCH) in a wireless communication system, the method comprising:
    transmitting configuration information related to the PUSCH;
    transmitting downlink control information (DCI) scheduling the PUSCH; and
    receiving the PUSCH based on the DCI,
    wherein the DCI includes a specific field,
    wherein based on that the specific field represents at least one sounding reference signal (SRS) resource related to a simultaneous transmission across multi-panel (STxMP), the PUSCH is transmitted based on a plurality of panels, and
    wherein the specific field is based on an SRS resource indicator (SRI) field representing at least one specific SRS resource which is configured based on i) a first parameter related to the plurality of panels, and ii) a second parameter related to one panel of the plurality of panels.

* * * * *